US010339956B2

(12) United States Patent
Xu

(10) Patent No.: US 10,339,956 B2
(45) Date of Patent: Jul. 2, 2019

(54) METHOD AND APPARATUS FOR DETECTING AUDIO SIGNAL ACCORDING TO FREQUENCY DOMAIN ENERGY

(71) Applicant: Huawei Technologies Co., Ltd., Shenzhen (CN)

(72) Inventor: Lijing Xu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 169 days.

(21) Appl. No.: 15/361,597

(22) Filed: Nov. 28, 2016

(65) Prior Publication Data

US 2017/0076739 A1 Mar. 16, 2017

Related U.S. Application Data

(63) Continuation of application No. PCT/CN2015/074176, filed on Mar. 13, 2015.

(30) Foreign Application Priority Data

Jul. 18, 2014 (CN) .......................... 2014 1 0344826

(51) Int. Cl.
G10L 21/0232 (2013.01)
G10L 25/21 (2013.01)
(Continued)

(52) U.S. Cl.
CPC .......... *G10L 25/21* (2013.01); *G10L 21/0232* (2013.01); *G10L 25/18* (2013.01);
(Continued)

(58) Field of Classification Search
CPC .................................................. G10L 21/0232
See application file for complete search history.

(56) References Cited

U.S. PATENT DOCUMENTS

| 2002/0082731 | A1 | 6/2002 | Pitman et al. |
| 2002/0143530 | A1 | 10/2002 | Pitman et al. |
| 2005/0058274 | A1* | 3/2005 | Zuluaga .................. H04M 1/60 379/386 |
| 2007/0271224 | A1* | 11/2007 | Essafi .................. G06F 17/3002 |
| 2008/0300702 | A1* | 12/2008 | Gomez .................. G10L 25/48 700/94 |

(Continued)

FOREIGN PATENT DOCUMENTS

| CN | 101299782 A | 11/2008 |
| CN | 101635865 A | 1/2010 |

(Continued)

OTHER PUBLICATIONS

Machine Translation and Abstract of Chinese Publication No. CN101872616, Oct. 27, 2010, 28 pages.

(Continued)

*Primary Examiner* — Bryan S Blankenagel
(74) *Attorney, Agent, or Firm* — Conley Rose, P.C.

(57) ABSTRACT

A method and an apparatus for detecting an audio signal according to frequency domain energy is presented. The method may include receiving an audio signal frame; acquiring frequency domain energy distribution of the audio signal frame; obtaining a maximum value distribution characteristic of a frequency domain energy distribution derivative of the audio signal frame according to the frequency domain energy distribution of the audio signal frame; using the audio signal frame and each frame in a preset neighborhood range of the audio signal frame as a frame set, where the frame set includes a to-be-detected frame; and detecting the to-be-detected frame according to a maximum value distribution characteristic of a frequency domain energy distribution derivative of the frame set. In the various embodiments, detection on an audio signal can be implemented.

16 Claims, 11 Drawing Sheets

(51) Int. Cl.
*H04M 1/24* (2006.01)
*G10L 25/51* (2013.01)
*H04M 19/04* (2006.01)
*G10L 25/18* (2013.01)

(52) U.S. Cl.
CPC .............. *G10L 25/51* (2013.01); *H04M 1/24* (2013.01); *H04M 19/04* (2013.01)

(56) References Cited

U.S. PATENT DOCUMENTS

| | | | | |
|---|---|---|---|---|
| 2010/0197255 | A1* | 8/2010 | Jaisimha | H04H 60/51 455/186.2 |
| 2010/0208902 | A1* | 8/2010 | Yoshizawa | G10L 21/0208 381/56 |
| 2011/0125490 | A1* | 5/2011 | Furuta | G10L 21/0232 704/205 |
| 2012/0093264 | A1* | 4/2012 | Yamaguchi | H04L 5/143 375/340 |
| 2012/0143363 | A1* | 6/2012 | Liu | G10L 15/02 700/94 |
| 2014/0073261 | A1* | 3/2014 | Hassan | H04W 24/00 455/67.11 |
| 2014/0142931 | A1* | 5/2014 | Qi | G10L 25/90 704/207 |
| 2015/0256794 | A1* | 9/2015 | Yamahara | H04N 7/147 348/14.06 |

FOREIGN PATENT DOCUMENTS

| | | |
|---|---|---|
| CN | 101872616 A | 10/2010 |
| CN | 103021408 A | 4/2013 |
| CN | 103632676 A | 3/2014 |
| WO | 0186633 A1 | 11/2001 |

OTHER PUBLICATIONS

Machine Translation and Abstract of Chinese Publication No. CN103021408, Apr. 3, 2013, 19 pages.
Machine Translation and Abstract of Chinese Publication No. CN103632676, Mar. 12, 2014, 14 pages.
Foreign Communication From a Counterpart Application, Chinese Application No. 201410344826.X, Chinese Office Action dated Sep. 18, 2017, 7 pages.
Foreign Communication From a Counterpart Application, European Application No. 15822426.1, Extended European Search Report dated May 22, 2017, 7 pages.
Foreign Communication From a Counterpart Application, PCT Application No. PCT/CN2015/074176, English Translation of International Search Report dated Jun. 1, 2015, 2 pages.
Foreign Communication From a Counterpart Application, PCT Application No. PCT/CN2015/074176, English Translation of Written Opinion Search Report dated Jun. 1, 2015, 5 pages.

* cited by examiner

METHOD AND APPARATUS FOR DETECTING AUDIO SIGNAL ACCORDING TO FREQUENCY DOMAIN ENERGY

CROSS-REFERENCE TO RELATED APPLICATIONS

This application is a continuation of International Application No. PCT/CN2015/074176, filed on Mar. 13, 2015, which claims priority to Chinese Patent Application No. 201410344826.X, filed on Jul. 18, 2014, both of which are hereby incorporated by reference in their entireties.

TECHNICAL FIELD

The present disclosure relates to the communications field, and in particular, to a method and apparatus for detecting an audio signal according to frequency domain energy.

BACKGROUND

An audio signal is a quite common signal processed or output by an electronic device. In addition, with the development of electronic technologies, there are increasing types of audio signals processed or output by an electronic device, for example, a voice signal, a ringback tone, a standard ringtone, an abnormal ringtone, a dual tone multiple frequency (DTMF) signal, and a frequency-shift keying (FSK) signal.

Because of the increasing types of the audio signals processed or output by the electronic device, the audio signal definitely needs to be detected, so as to obtain a detection result of the audio signal, for example, to obtain a type or a characteristic of a to-be-detected audio signal. However, currently, an audio signal cannot be detected in the communications field.

SUMMARY

The present disclosure provides a method and an apparatus for detecting an audio signal according to frequency domain energy, to implement detection an audio signal.

According to a first aspect, the present disclosure provides a method for detecting an audio signal according to frequency domain energy, where the method includes receiving an audio signal frame; acquiring frequency domain energy distribution of the audio signal frame, where the frequency domain energy distribution represents an energy distribution characteristic of the audio signal frame in a frequency domain; obtaining a maximum value distribution characteristic of a frequency domain energy distribution derivative of the audio signal frame according to the frequency domain energy distribution of the audio signal frame; using the audio signal frame and each frame in a preset neighborhood range of the audio signal frame as a frame set, where the frame set includes a to-be-detected frame; and detecting the to-be-detected frame according to a maximum value distribution characteristic of a frequency domain energy distribution derivative of the frame set.

In a first possible implementation manner of the first aspect, the acquiring frequency domain energy distribution of the audio signal frame includes acquiring a ratio of a sum of energy of the audio signal frame in any range in a specified frequency domain range to total energy of the audio signal frame in the specified frequency domain range, where the ratio represents the frequency domain energy distribution of the audio signal frame.

With reference to the first possible implementation manner of the first aspect, in a second possible implementation manner of the first aspect, the acquiring a ratio of a sum of energy of the audio signal frame in any range in a specified frequency domain range to total energy of the audio signal frame in the specified frequency domain range includes performing Fourier transform on the audio signal frame to obtain a frequency domain signal; and obtaining the frequency domain energy distribution ratio according to $$\text{ratio\_energy}_k(f) = \frac{\sum_{i=0}^{f}(\text{Re\_fft}^2(i) + \text{Im\_fft}^2(i))}{\sum_{i=0}^{(F_{lim}-1)}(\text{Re\_fft}^2(i) + \text{Im\_fft}^2(i))} \times 100\%,$$

$$f \in [0, (F_{lim} - 1)]$$

where $\text{ratio\_energy}_k(f)$ represents the frequency domain energy distribution ratio, f represents a quantity of spectral lines, $f \in [0, (F_{lim}-1)]$, it is assumed that a fast Fourier transform (FFT) transform size is F, $F_{lim} \leq F/2$, $\text{Re\_fft}(i)$ represents a real part of an FFT transform result, $\text{Im\_fft}(i)$ represents an imaginary part of the FFT transform result, $$\sum_{i=0}^{(F_{lim}-1)}(\text{Re\_fft}^2(i) + \text{Im\_fft}^2(i))$$

represents a sum of energy of the audio signal frame in a frequency domain range corresponding to $$f \in [0, (F_{lim} - 1)],$$

and $$\sum_{i=0}^{f}(\text{Re\_fft}^2(i) + \text{Im\_fft}^2(i))$$

represents total energy of the audio signal frame in a frequency domain range corresponding to 0~f.

With reference to the first possible implementation manner of the first aspect or the second possible implementation manner of the first aspect, in a third possible implementation manner of the first aspect, the obtaining a maximum value distribution characteristic of a frequency domain energy distribution derivative of the audio signal frame according to the frequency domain energy distribution of the audio signal frame includes calculating a derivative of the frequency domain energy distribution ratio, to obtain a frequency domain energy distribution derivative; and obtaining the maximum value distribution characteristic of the frequency domain energy distribution derivative of the audio signal frame according to the frequency domain energy distribution derivative.

With reference to the third possible implementation manner of the first aspect, in a fourth possible implementation manner of the first aspect, the calculating a derivative of the frequency domain energy distribution ratio, to obtain a frequency domain energy distribution derivative includes:

$$\text{ratio\_energy}'_k(f) = \left(\sum_{n=f-\frac{N-1}{2}}^{f+\frac{N-1}{2}}\left(\left(\prod_{\substack{i=f-\frac{N-1}{2}\\i\neq n}}^{f+\frac{N-1}{2}}\frac{f-i}{n-i}\right)*\text{ratio\_energy}_k(n)\right)\right)',$$

$$f \in \left[\frac{N-1}{2},\left(F_{lim}-\frac{N-1}{2}\right)\right]$$

where N represents a numerical differentiation order, ratio_energy$'_k$(f) represents a frequency domain energy distribution derivative of the $k^{th}$ frame, ratio_energy$_k$(n) represents the frequency domain energy distribution ratio of the $k^{th}$ frame, and $$f \in \left[\frac{N-1}{2},\left(F_{lim}-\frac{N-1}{2}\right)\right].$$

With reference to the third possible implementation manner of the first aspect or the fourth possible implementation manner of the first aspect, in a fifth possible implementation manner of the first aspect, the obtaining the maximum value distribution characteristic of the frequency domain energy distribution derivative of the audio signal frame according to the frequency domain energy distribution derivative includes acquiring at least one maximum value in derivative values of energy distribution parameters; and obtaining the maximum value distribution characteristic of the frequency domain energy distribution derivative of the audio signal frame according to a location of each maximum value at a spectral line.

With reference to any implementation manner of the first aspect, in a sixth possible implementation manner of the first aspect, the detecting the to-be-detected frame according to a maximum value distribution characteristic of a frequency domain energy distribution derivative of the frame set includes, if a quantity of parameters that are in a preset first interval and in maximum value distribution parameters of the frequency domain energy distribution derivative of the frame set is greater than or equal to a first threshold, determining that the to-be-detected frame is a standard to-be-detected signal; or if the to-be-detected frame is not a standard to-be-detected signal but a quantity of parameters that are in a preset second interval and in maximum value distribution parameters of the frequency domain energy distribution derivative of the frame set is greater than or equal to a second threshold, determining that the to-be-detected frame is an abnormal to-be-detected signal.

According to a second aspect, the present disclosure provides an apparatus for detecting an audio signal according to frequency domain energy, including a receiving unit, an acquiring unit, an obtaining unit, a collection unit, and a detection unit, where the receiving unit is configured to receive an audio signal frame; the acquiring unit is configured to acquire frequency domain energy distribution of the audio signal frame, where the frequency domain energy distribution represents an energy distribution characteristic of the audio signal frame in a frequency domain; the obtaining unit is configured to obtain a maximum value distribution characteristic of a frequency domain energy distribution derivative of the audio signal frame according to the frequency domain energy distribution of the audio signal frame; the collection unit is configured to use the audio signal frame and each frame in a preset neighborhood range of the audio signal frame as a frame set, where the frame set includes a to-be-detected frame; and the detection unit is configured to detect the to-be-detected frame according to a maximum value distribution characteristic of a frequency domain energy distribution derivative of the frame set.

In a first possible implementation manner of the second aspect, the acquiring unit is configured to acquire a ratio of a sum of energy of the audio signal frame in any range in a specified frequency domain range to total energy of the audio signal frame in the specified frequency domain range, where the ratio represents the frequency domain energy distribution of the audio signal frame.

With reference to the first possible implementation manner of the second aspect, in a second possible implementation manner of the second aspect, the acquiring unit is configured to perform Fourier transform on the audio signal frame to obtain a frequency domain signal; and obtain the frequency domain energy distribution ratio according to $$\text{ratio\_energy}_k(f) = \frac{\sum_{i=0}^{f}(\text{Re\_fft}^2(i)+\text{Im\_fft}^2(i))}{\sum_{i=0}^{(F_{lim}-1)}(\text{Re\_fft}^2(i)+\text{Im\_fft}^2(i))} \times 100\%,$$

$$f \in [0,(F_{lim}-1)]$$

where ratio_energy$_k$(f) represents the frequency domain energy distribution ratio, f represents a quantity of spectral lines, f∈[0, (F$_{lim}$−1)], it is assumed that an FFT transform size is F, F$_{lim}$≤F/2, Re_fft(i) represents a real part of an FFT transform result, Im_fft(i) represents an imaginary part of the FFT transform result, $$\sum_{i=0}^{(F_{lim}-1)}(\text{Re\_fft}^2(i)+\text{Im\_fft}^2(i))$$

represents a sum of energy of the audio signal frame in a frequency domain range corresponding to $$f \in [0,(F_{lim}-1)],$$

and $$\sum_{i=0}^{f}(\text{Re\_fft}^2(i)+\text{Im\_fft}^2(i))$$

represents total energy of the audio signal frame in a frequency domain range corresponding to 0~f.

With reference to the first possible implementation manner of the second aspect or the second possible implementation manner of the second aspect, in a third possible implementation manner of the second aspect, the obtaining unit includes a derivative calculation unit configured to calculate a derivative of the frequency domain energy distribution ratio, to obtain a frequency domain energy distribution derivative; and an obtaining subunit configured to obtain the maximum value distribution characteristic of the frequency domain energy distribution derivative of the audio signal frame according to the frequency domain energy distribution derivative.

With reference to the third possible implementation manner of the second aspect, in a fourth possible implementation manner of the second aspect, that the derivative calculation unit calculates the derivative of the frequency domain energy distribution ratio, to obtain the frequency domain energy distribution derivative includes:

$$\text{ratio\_energy}'_k(f) = \left( \sum_{n=f-\frac{N-1}{2}}^{f+\frac{N-1}{2}} \left( \left( \prod_{\substack{i=f-\frac{N-1}{2} \\ i \neq n}}^{f+\frac{N-1}{2}} \frac{f-i}{n-i} \right) * \text{ratio\_energy}_k(n) \right) \right)',$$

$$f \in \left[ \frac{N-1}{2}, \left( F_{lim} - \frac{N-1}{2} \right) \right]$$

where N represents a numerical differentiation order, ratio_energy'$_k$(f) represents a frequency domain energy distribution derivative of the k$^{th}$ frame, ratio_energy$_k$(n) represents the frequency domain energy distribution ratio of the k$^{th}$ frame, and $$f \in \left[ \frac{N-1}{2}, \left( F_{lim} - \frac{N-1}{2} \right) \right].$$

With reference to the third possible implementation manner of the second aspect or the fourth possible implementation manner of the second aspect, in a fifth possible implementation manner of the second aspect, the obtaining subunit is configured to acquire at least one maximum value in derivative values of energy distribution parameters; and obtain the maximum value distribution characteristic of the frequency domain energy distribution derivative of the audio signal frame according to a location of each maximum value at a spectral line.

With reference to any possible implementation manner of the second aspect, in a sixth possible implementation manner of the second aspect, the detection unit is configured to, if a quantity of parameters that are in a preset first interval and in maximum value distribution parameters of the frequency domain energy distribution derivative of the frame set is greater than or equal to a first threshold, determine that the to-be-detected frame is a standard to-be-detected signal; or if the to-be-detected frame is not a standard to-be-detected signal but a quantity of parameters that are in a preset second interval and in maximum value distribution parameters of the frequency domain energy distribution derivative of the frame set is greater than or equal to a second threshold, determine that the to-be-detected frame is an abnormal to-be-detected signal.

In the foregoing technical solutions, after an audio signal frame is received, frequency domain energy distribution of the audio signal frame is acquired; a maximum value distribution characteristic of a frequency domain energy distribution derivative of the audio signal frame is obtained according to the frequency domain energy distribution of the audio signal frame, and the audio signal frame and each frame in a preset neighborhood range of the audio signal frame are used as a frame set, where the frame set includes a to-be-detected frame. In this way, the to-be-detected frame can be detected according to a maximum value distribution characteristic of a frequency domain energy distribution derivative of the frame set. Therefore, detection on an audio signal can be implemented in the present disclosure.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
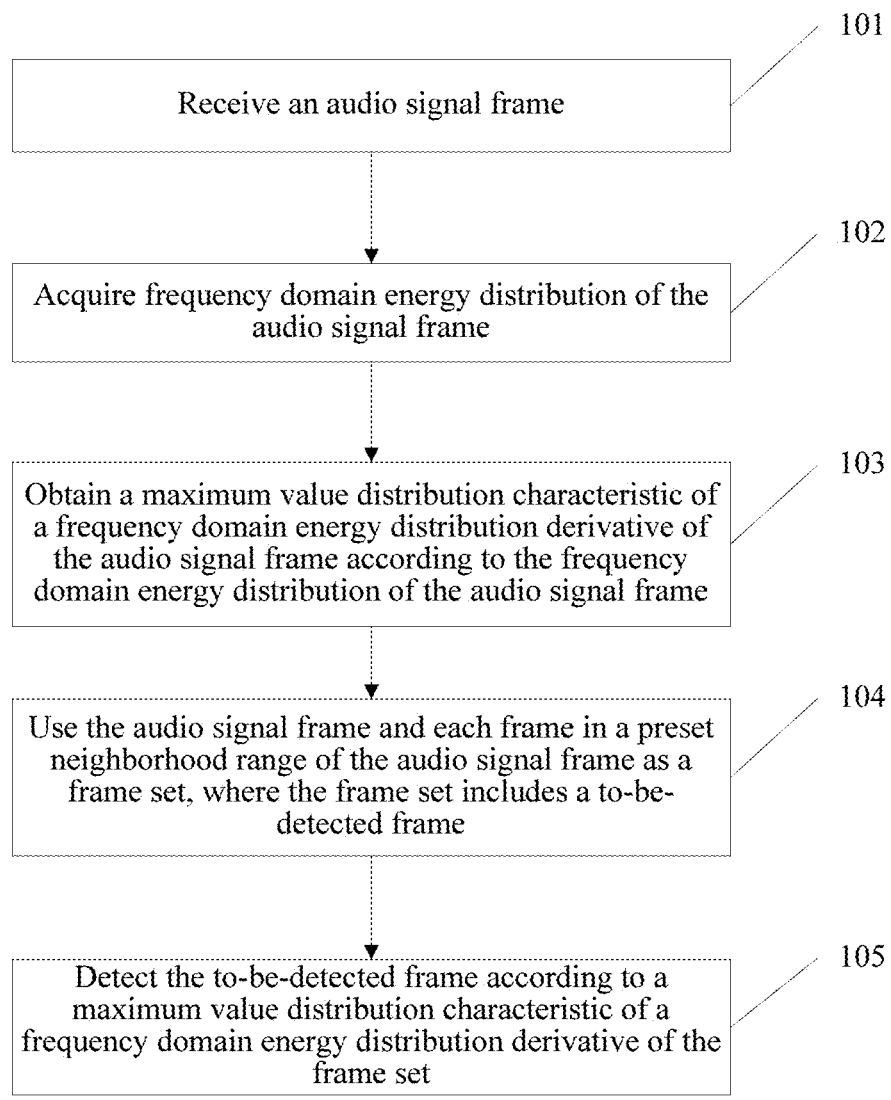
FIG. 1 is a schematic flowchart of a method for detecting an audio signal according to frequency domain energy according to an embodiment of the present disclosure.

Referring to FIG. 1, FIG. 1 is a schematic flowchart of a method for detecting an audio signal according to frequency domain energy according to an embodiment of the present disclosure. As shown in FIG. 1, the method includes the following steps.

101. Receive an audio signal frame.

Step 101 may be receiving the audio signal frame using a network, or receiving the audio signal frame using a recording apparatus.

Optionally, the audio signal frame may be an audio signal frame in any audio signal that can be processed in an electronic device, for example, a voice signal, a ringtone signal, a DTMF signal, or a FSK signal. The ringtone signal may include a ringback tone, a standard ringtone, and an abnormal ringtone. In addition, the audio signal frame may be an audio signal frame at any location in a to-be-detected audio signal, for example, may be a start frame of the to-be-detected audio signal, or may be a signal frame in a middle part of the to-be-detected audio signal, or may be an end frame of the to-be-detected audio signal.

Step 102. Acquire frequency domain energy distribution of the audio signal frame, where the frequency domain energy distribution represents an energy distribution characteristic of the audio signal frame in a frequency domain.

Step 103. Obtain a maximum value distribution characteristic of a frequency domain energy distribution derivative of the audio signal frame according to the frequency domain energy distribution of the audio signal frame.

Step 104. Use the audio signal frame and each frame in a preset neighborhood range of the audio signal frame as a frame set, where the frame set includes a to-be-detected frame.

Optionally, the preset neighborhood range may be a preset range of a quantity of frames. For example, the frame in the preset neighborhood range of the audio signal frame may refer to a particular quantity of audio signal frames adjacent to the audio signal frame, so that the frame set includes the audio signal frame and the particular quantity of the audio signal frames adjacent to the audio signal frame. Alternatively, the preset neighborhood range may be a preset time range. For example, the frame in the preset neighborhood range of the audio signal frame may refer to an audio signal frame that is adjacent to the audio signal frame and that is received in a particular time, so that the frame set includes the audio signal frame and the audio signal frame that is adjacent to the audio signal frame and that is received in the particular time. The to-be-detected frame may be one or more audio signal frames included in the frame set.

In addition, a maximum value distribution characteristic of a derivative of a frequency domain energy distribution ratio of each audio signal frame included in the frame set may be obtained using steps 101, 102, and 103, steps 101, 102, and 103 may be performed multiple times.

Step 105. Detect the to-be-detected frame according to a maximum value distribution characteristic of a frequency domain energy distribution derivative of the frame set.

The maximum value distribution characteristic of the frequency domain energy distribution derivative of the frame set may refer to maximum value distribution characteristics of frequency domain energy distribution derivatives of one or more audio signal frames in the frame set, or the maximum value distribution characteristic of the frequency domain energy distribution derivative of the frame set may refer to a maximum value distribution characteristic of a frequency domain energy distribution derivative of each audio signal frame in the frame set.

Optionally, step 105 may be performing audio signal classification detection on the to-be-detected frame, or step 105 may be performing audio signal characteristic detection on the to-be-detected frame, or the like.

Optionally, the method may be applied to any electronic device having a function of computing and playing an audio signal, for example, a tablet computer, a mobile phone, an e-reader, a remote controller, a personal computer (PC), a notebook computer, an on-board equipment, a web television, a wearable device, a network device, a server, a base station, or a universal media gateway (UMG).

In this embodiment, after an audio signal frame is received, frequency domain energy distribution of the audio signal frame is acquired; a maximum value distribution characteristic of a frequency domain energy distribution derivative of the audio signal frame is obtained according to the frequency domain energy distribution of the audio signal frame, and the audio signal frame and each frame in a preset neighborhood range of the audio signal frame are used as a frame set, where the frame set includes a to-be-detected frame. In this way, the to-be-detected frame can be detected according to a maximum value distribution characteristic of a frequency domain energy distribution derivative of the frame set. Therefore, detection on an audio signal can be implemented in the present disclosure.

Figure 2:
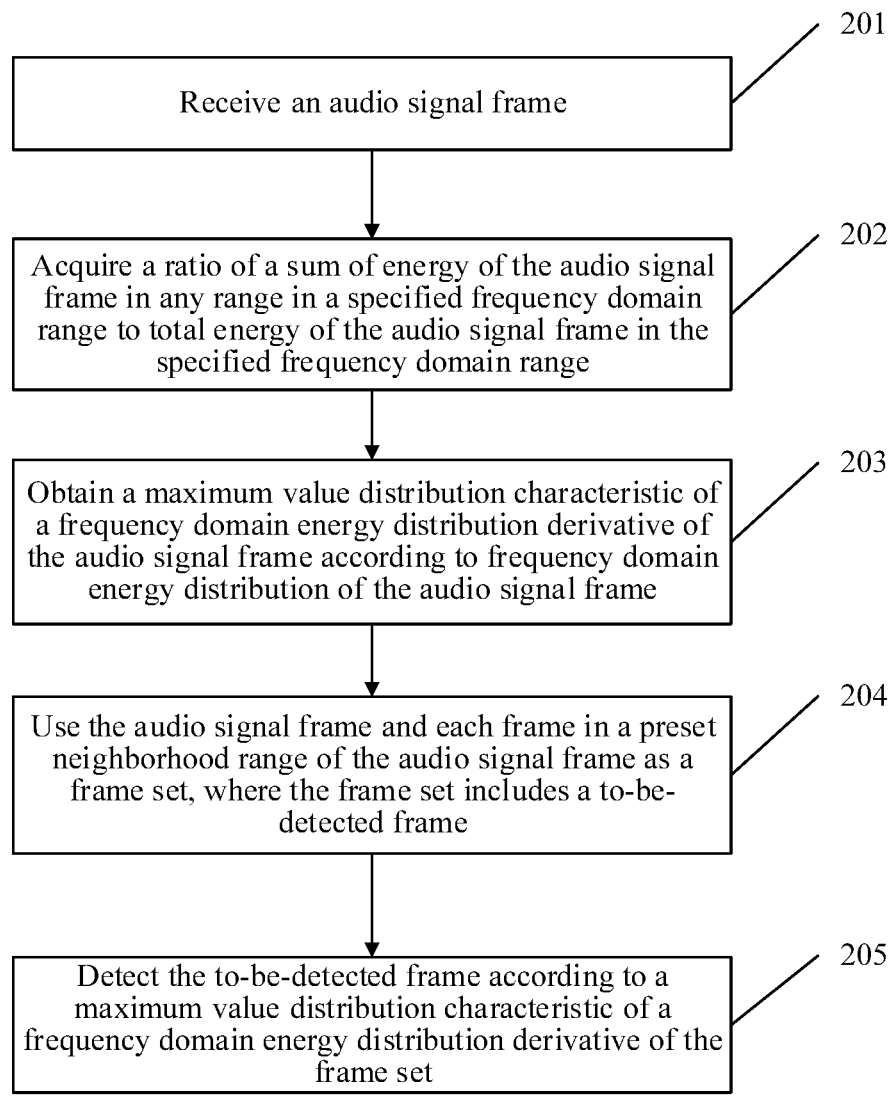
FIG. 2 is a schematic flowchart of another method for detecting an audio signal according to frequency domain energy according to an embodiment of the present disclosure.

Referring to FIG. 2, FIG. 2 is a schematic flowchart of another method for detecting an audio signal according to frequency domain energy according to an embodiment of the present disclosure. As shown in FIG. 2, the method includes the following steps.

Step 201. Receive an audio signal frame.

Step 202. Acquire a ratio of a sum of energy of the audio signal frame in any range in a specified frequency domain range to total energy of the audio signal frame in the specified frequency domain range, where the ratio represents the frequency domain energy distribution of the audio signal frame.

The specified frequency domain range may be set in advance. In addition, multiple frequency domain ranges may be set in advance.

Optionally, in this implementation manner, the acquiring a ratio of a sum of energy of the audio signal frame in any range in a specified frequency domain range to total energy of the audio signal frame in the specified frequency domain range may include performing Fourier transform on the audio signal frame to obtain a frequency domain signal; and obtaining the frequency domain energy distribution ratio according to $$\text{ratio\_energy}_k(f) = \frac{\sum_{i=0}^{f}(\text{Re\_fft}^2(i) + \text{Im\_fft}^2(i))}{\sum_{i=0}^{(F_{lim}-1)}(\text{Re\_fft}^2(i) + \text{Im\_fft}^2(i))} \times 100\%,$$

$$f \in [0, (F_{lim} - 1)]$$

where f represents a quantity of spectral lines, $f \in [0, (F_{lim}-1)]$, it is assumed that an FFT transform size is F, $F_{lim} \leq F/2$, Re_fft(i) represents a real part of an FFT transform result, Im_fft(i) represents an imaginary part of the FFT transform result, $$\sum_{i=0}^{(F_{lim}-1)}(\text{Re\_fft}^2(i) + \text{Im\_fft}^2(i))$$

represents a sum of energy of the audio signal frame in a frequency domain range corresponding to $$f \in [0, (F_{lim} - 1)], \text{ and } \sum_{i=0}^{f} (\text{Re\_fft}^2(i) + \text{Im\_fft}^2(i))$$

represents total energy of the audio signal frame in a frequency domain range corresponding to 0~f.

Step 203. Obtain a maximum value distribution characteristic of a frequency domain energy distribution derivative of the audio signal frame according to the frequency domain energy distribution of the audio signal frame.

Optionally, step 203 may include calculating a derivative of the frequency domain energy distribution ratio, to obtain a frequency domain energy distribution derivative; and obtaining the maximum value distribution characteristic of the frequency domain energy distribution derivative of the audio signal frame according to the frequency domain energy distribution derivative.

Step 203 may be calculating a derivative of the frequency domain energy distribution ratio using a differential operation, to obtain the frequency domain energy distribution derivative. For example, step 103 may be calculating the derivative of the frequency domain energy distribution ratio using the Lagrange numerical differential method.

Optionally, the step of calculating a derivative of the frequency domain energy distribution ratio, to obtain a frequency domain energy distribution derivative may include:

$$\text{ratio\_energy}'_k(f) = \left( \sum_{n=f-\frac{N-1}{2}}^{f+\frac{N-1}{2}} \left( \left( \prod_{\substack{i=f-\frac{N-1}{2} \\ i \neq n}}^{f+\frac{N-1}{2}} \frac{f-i}{n-i} \right) * \text{ratio\_energy}_k(n) \right) \right)'$$

$$f \in \left[ \frac{N-1}{2}, \left( F_{lim} - \frac{N-1}{2} \right) \right]$$

where N represents a numerical differentiation order, ratio_energy'$_k$(f) represents a derivative of an energy distribution ratio of the $k^{th}$ frame, ratio_energy$_k$(n) represents the energy distribution ratio of the $k^{th}$ frame, and $$f \in \left[ \frac{N-1}{2}, \left( F_{lim} - \frac{N-1}{2} \right) \right].$$

The frequency domain energy distribution derivative may be obtained using the foregoing formula.

Optionally, the obtaining the maximum value distribution characteristic of the frequency domain energy distribution derivative of the audio signal frame according to the frequency domain energy distribution derivative may include acquiring at least one maximum value in derivative values of energy distribution parameters; and obtaining the maximum value distribution characteristic of the frequency domain energy distribution derivative of the audio signal frame according to a location of each maximum value at a spectral line.

The at least one maximum value may be one or more top-ranked derivative values obtained after at least one derivative value of the energy distribution parameter is sorted in descending order. For example, when the at least one maximum value represents one maximum value, the at least one maximum value may be the largest value in the derivative values of the energy distribution parameters, or when the at least one maximum value represents two maximum values, the at least one maximum value may include the largest value and the second largest value in the derivative values of the energy distribution parameters.

Because the location of each maximum value at the spectral line is obtained, the maximum value distribution characteristic of the frequency domain energy distribution derivative of the audio signal frame may be obtained. For example, the maximum value distribution characteristic of the frequency domain energy distribution derivative of the audio signal frame may include a location of at least one maximum value in the derivative values of the energy distribution parameters of the audio signal frame at the spectral line.

Step 204. Use the audio signal frame and each frame in a preset neighborhood range of the audio signal frame as a frame set, where the frame set includes a to-be-detected frame.

Step 205. Detect the to-be-detected frame according to a maximum value distribution characteristic of a frequency domain energy distribution derivative of the frame set.

Optionally, step 205 may be detecting whether the to-be-detected frame is a particular to-be-detected signal, for example, detecting whether the to-be-detected frame is a standard ringtone, or detecting whether the to-be-detected frame is a DTMF signal, or detecting whether the to-be-detected frame is an FSK signal. For example, step 205 may include, if a quantity of parameters that are in a preset first interval and in maximum value distribution parameters of the frequency domain energy distribution derivative of the frame set is greater than or equal to a first threshold, determining that the to-be-detected frame is a standard to-be-detected signal, or if the to-be-detected frame is not a standard to-be-detected signal but a quantity of parameters that are in a preset second interval and in maximum value distribution parameters of the frequency domain energy distribution derivative of the frame set is greater than or equal to a second threshold, determining that the to-be-detected frame is an abnormal to-be-detected signal.

Optionally, the maximum value distribution parameter of the frequency domain energy distribution derivative of the frame set may refer to a maximum value distribution parameter of a frequency domain energy distribution derivative of each audio signal frame in the frame set. In addition, the maximum value distribution parameter of the frequency domain energy distribution derivative may be a parameter used to represent a maximum value distribution characteristic of the frequency domain energy distribution derivative. In addition, the first interval may be a preset parameter interval corresponding to the standard to-be-detected signal, for example, a preset spectral line location interval corresponding to the standard to-be-detected signal. The first threshold may be a preset threshold corresponding to the standard to-be-detected signal. The second interval may be a preset parameter interval corresponding to the abnormal to-be-detected signal, for example, a preset spectral line location interval corresponding to the abnormal to-be-detected signal. The second threshold may be a preset threshold corresponding to the abnormal to-be-detected signal. In addition, an interval range of the second interval may be greater than or equal to an interval range of the first interval.

In this implementation manner, it may be detected first whether the to-be-detected frame is a standard to-be-detected signal, and if yes, it is determined that the to-be-detected frame is a standard to-be-detected signal, or if not, it is detected whether the to-be-detected frame is an abnormal to-be-detected signal. Therefore, a standard to-be-detected signal and an abnormal to-be-detected signal can be detected.

Based on the first method embodiment, multiple optional implementation manners are added in this embodiment, and detection on an audio signal is implemented in the two embodiments.

Figure 3:
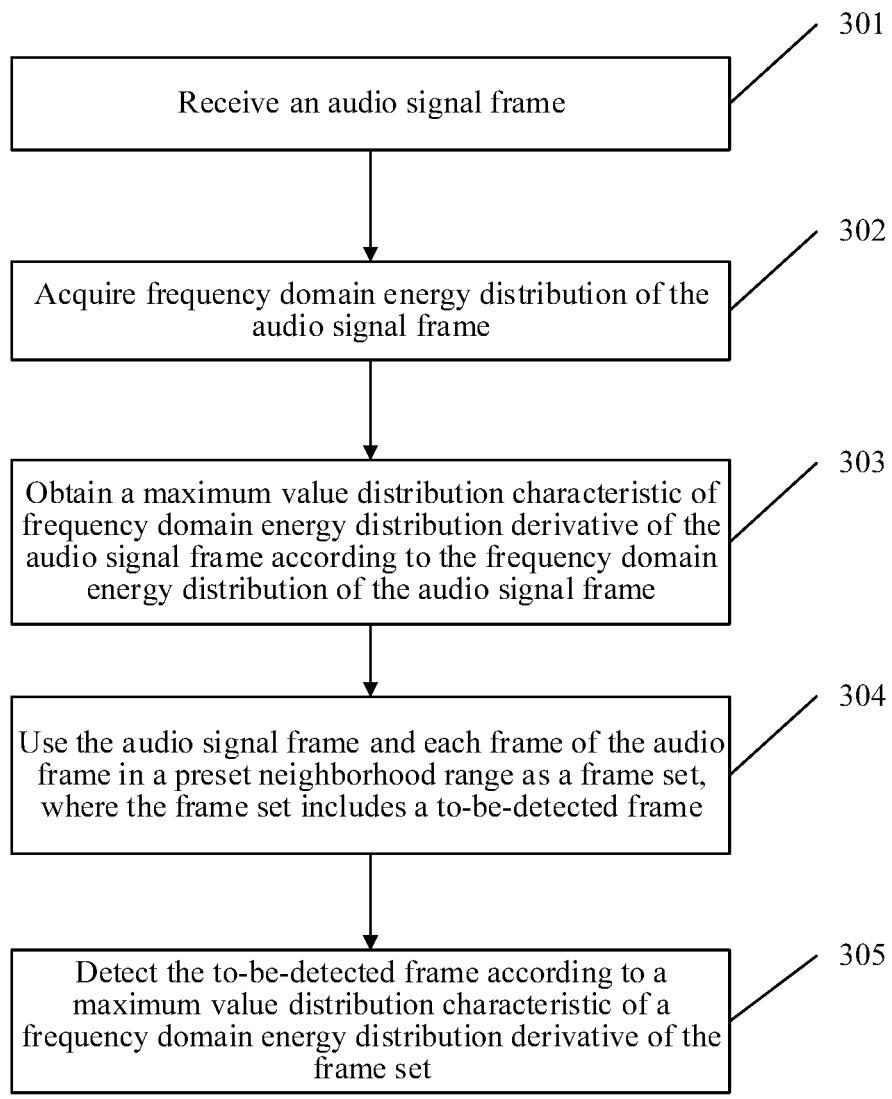
FIG. 3 is a schematic flowchart of another method for detecting an audio signal according to frequency domain energy according to an embodiment of the present disclosure.

Referring to FIG. 3, FIG. 3 is a schematic flowchart of another method for detecting an audio signal according to frequency domain energy according to an embodiment of the present disclosure. This embodiment is described using an example in which a ringtone signal is detected and, a standard ringtone and noise are detected.

Standard ringtone specifications are different in different countries and regions. An audio signal needs to be detected in many occasions, to detect whether the audio signal is a standard ringtone or an abnormal ringtone. In an application occasion of a voice quality monitoring (VQM) model, a to-be-analyzed signal may include a non-voice signal, for example, a ringtone signal. In this way, before the to-be-analyzed signal is input into the VQM, signal classification should be first performed on the to-be-analyzed signal. If it is identified that the sequence is a ringtone signal or the like, the sequence is not sent to a VQM module for quality evaluation; otherwise, the VQM may consider the sequence as a voice signal, and provides an incorrect quality evaluation result. For this problem, in the method for detecting an audio signal according to frequency domain energy provided in this embodiment of the present disclosure, a frequency domain energy change of an audio signal may be analyzed, so that a ringtone signal is detected.

Further, the method for detecting an audio signal according to frequency domain energy provided in this embodiment of the present disclosure may further be applied to noise detection. In some application occasions, both a ringtone and voice become abnormal. For example, a problem occurs in a chip of a voice processing (VPU) board of a UMG, an exception definitely occurs as long as a call is made using the chip, and both a ringtone and voice are severely distorted. As a result, noise is generated, and the ringtone and the voice cannot be clearly heard. Compared with abnormal voice, it may be easier to detect an abnormal ringtone. Therefore, noise may be detected by detecting the abnormal ringtone.

As shown in FIG. 3, the method may include the following steps.

Step 301. Receive an audio signal frame.

This embodiment is described using an example in which a ringtone signal is detected. However, the technical solution is not limited to detection on a ringtone signal, and is also applicable to other many types of signals, for example, a DTMF signal and an FSK signal.

The ringtones have different specifications in different countries and regions. In a time domain, a complete ringtone signal may include a periodic signal, or may include two periodic signals. In a frequency domain, a periodic signal may be a single-frequency signal or may be a dual-frequency signal.

Figure 4A:
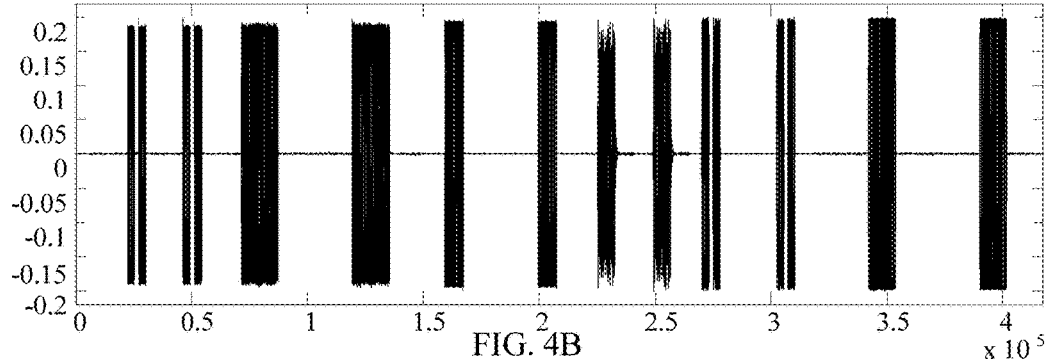
FIG. 4A and FIG. 4B are a schematic diagram of a standard ringtone sequence.
Figure 4B:
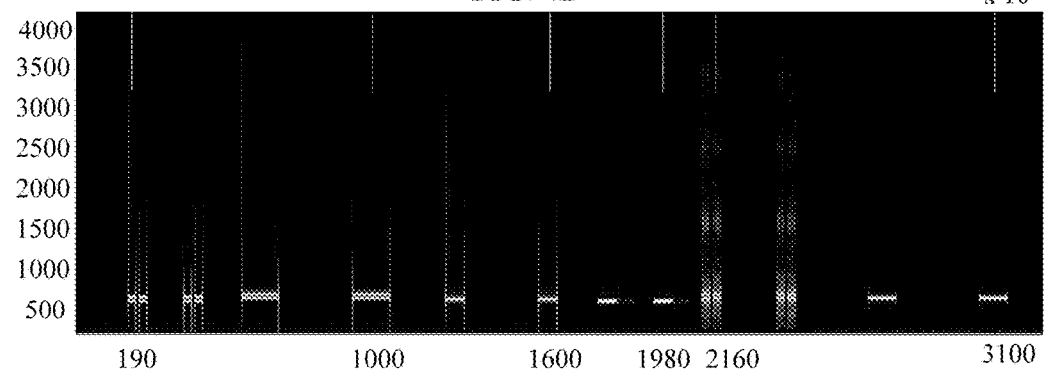

A standard ringtone sequence shown in FIG. 4A and FIG. 4B are a used an example for description, and the sequence may include a combination of ringtones of the United Kingdom of Great Britain and Northern Ireland, the United States of America, Germany, Japan, Hong Kong, and France. FIG. 4A is a time domain waveform diagram, a lateral axis indicates sample points, and a longitudinal axis indicates normalized amplitude. FIG. 4B is a spectrogram, a lateral axis indicates quantities of frames, where the quantities of frames correspond to the sample points in FIG. 4A in the time domain, and a longitudinal axis indicates frequencies.

It can be learned from FIG. 4A that, the ringtones in different countries and regions are represented differently in the time domain. For a first group of the ringtone of the United Kingdom of Great Britain and Northern Ireland and a fifth group of the Hong Kong ringtone, a complete ringtone signal includes two periodic signals; and for a second group of the ringtone of the United States of America, a third group of the German ringtone, a fourth group of the Japanese ringtone, and a sixth group of the French ringtone, a complete ringtone signal includes one periodic signal.

It can be learned from FIG. 4B that, the ringtones in different countries and regions are represented differently in the frequency domain. The first group of the ringtone of the United Kingdom of Great Britain and Northern Ireland, the second group of the ringtone of the United States of America, the fourth group of the Japanese ringtone, and the fifth group of the Hong Kong ringtone are dual-frequency sequences, and two obvious "bright lines" can be seen in the spectrogram, one ringtone signal includes two frequency components. The third group of the German ringtone and the sixth group of the French ringtone are single-frequency sequences, only one obvious "bright line" can be seen in the spectrogram, one ringtone signal includes only one frequency component. Frequency values of the ringtones in different countries and regions are different. For example, in a dual-frequency sequence, frequency values of the ringtone of the United Kingdom of Great Britain and Northern Ireland are 400 Hertz (Hz) and 450 Hz, and in a single-frequency sequence, a frequency value of the German ringtone is 425 Hz.

Step 302. Acquire frequency domain energy distribution of the audio signal frame, where the frequency domain energy distribution represents an energy distribution characteristic of the audio signal frame in a frequency domain.

Optionally, step 302 may be first performing FFT on an audio signal, to obtain a frequency domain representation form of the audio signal, and then acquiring the frequency domain energy distribution ratio of the audio signal frame. The frequency domain energy distribution ratio of the audio signal frame is used to represent a distribution characteristic of energy of the current frame in the frequency domain.

Assuming that the audio signal frame is a current frame of an audio signal, and the current frame is the $k^{th}$ frame, a general formula of a frequency domain energy distribution ratio of a current-frame signal is:

$$\text{ratio\_energy}_k(f) = \frac{\sum_{i=0}^{f} (\text{Re\_fft}^2(i) + \text{Im\_fft}^2(i))}{\sum_{i=0}^{(F_{lim}-1)} (\text{Re\_fft}^2(i) + \text{Im\_fft}^2(i))} \times 100\%, \quad (1)$$

$$f \in [0, (F_{lim} - 1)]$$

where f represents a quantity of spectral lines, $f \in [0, F_{lim}-1]$, it is assumed that an FFT transform size is F, $F_{lim} \leq F/2$, Re_fft(i) represents a real part of an FFT transform result of the $k^{th}$ frame, Im_fft(i) represents an imaginary part of the FFT transform result of the $k^{th}$ frame, $$\sum_{i=0}^{(F_{lim}-1)} (\text{Re\_fft}^2(i) + \text{Im\_fft}^2(i))$$

represents a sum of energy of the $k^{th}$ frame in a frequency domain range corresponding to $$i \in [0, (F_{lim} - 1)], \text{ and } \sum_{i=0}^{f} (\text{Re\_fft}^2(i) + \text{Im\_fft}^2(i))$$

represents a sum of energy of the $k^{th}$ frame in a frequency range corresponding to $i \in [0, f]$.

A value of $F_{lim}$ may be set according to experience, for example, may be set to $F_{lim}=F/2$, and the formula (1) is transformed into a formula (2).

$$\text{ratio\_energy}_k(f) = \frac{\sum_{i=0}^{f}(\text{Re\_fft}^2(i) + \text{Im\_fft}^2(i))}{\sum_{i=0}^{(F/2-1)}(\text{Re\_fft}^2(i) + \text{Im\_fft}^2(i))} \times 100\%, \quad (2)$$

$$f \in [0, (F/2-1)] \text{ where } \sum_{i=0}^{(F/2-1)}(\text{Re\_fft}^2(i) + \text{Im\_fft}^2(i))$$

represents total energy of the $k^{th}$ frame, and $$\sum_{i=0}^{f}(\text{Re\_fft}^2(i) + \text{Im\_fft}^2(i))$$

represents a sum of energy of the $k^{th}$ frame in a frequency range corresponding to $i \in [0, f]$.

The $190^{th}$ frame, the $1000^{th}$ frame, the $1600^{th}$ frame, the $1980^{th}$ frame, the $2160^{th}$ frame, and the $3100^{th}$ frame marked by six white dotted lines in FIG. 4B are separately in six different ringtone sequences. For the ringtone sequences shown in FIG. 4A and FIG. 4B, from top to bottom, six subdiagrams in FIG. 5 respectively show frequency domain energy distribution curves of the $190^{th}$ frame, the $1000^{th}$ frame, the $1600^{th}$ frame, the $1980^{th}$ frame, the $2160^{th}$ frame, and the $3100^{th}$ frame. In each subdiagram, a lateral axis indicates a spectral line, and a value range is $[1, (F/2-1)]$; a longitudinal axis indicates a percent ratio, and a value range is 0 to 100%. In this embodiment, it is assumed that a sampling rate is 8 kilohertz (kHz), the FFT transform size is 1024, and a frequency resolution corresponding to each spectral line is 7.8125 Hz. For ease of showing, the lateral axis shows only frequency domain energy distribution curves of spectral lines whose values are from 1 to 128.

Figure 5:
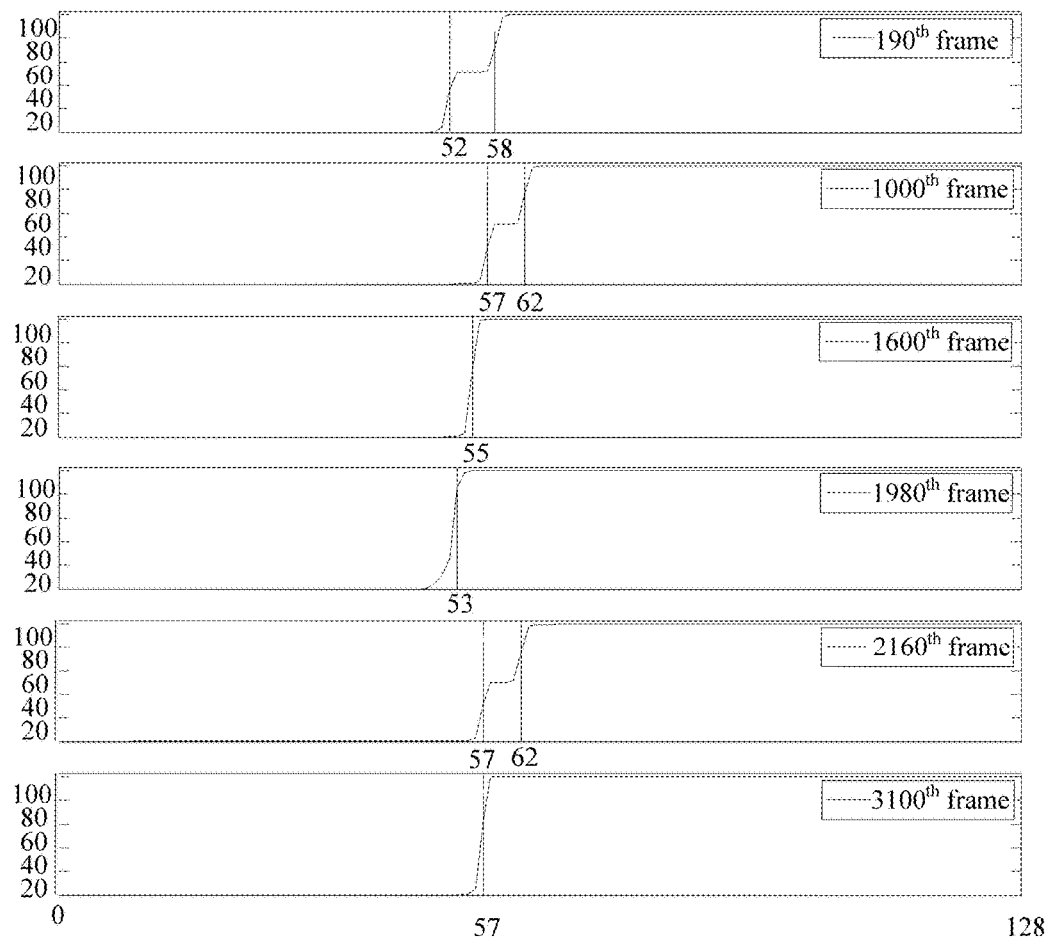
FIG. 5 is a schematic diagram of a frequency domain energy distribution curve according to an embodiment.

As shown in FIG. 5, if the ringtone is a single-frequency signal, the energy distribution ratio changes suddenly from 0% to 100% around a particular spectral line. Using the German ringtone in the third subdiagram as an example, the energy distribution ratio changes suddenly from 0% to 100% around a spectral line 55. It is already known that a specified frequency value of the German ringtone is 425 Hz, a frequency value corresponding to the spectral line 55 is about 425.8 Hz, which is located in a neighboring area of 425 Hz. If the ringtone is a dual-frequency signal, the energy distribution ratio changes suddenly from 0% to about 50% around the first particular spectral line, and changes suddenly from about 50% to 100% around the second particular spectral line. Using the ringtone of the United Kingdom of Great Britain and Northern Ireland in the first subdiagram as an example, the energy distribution ratio changes suddenly from 0% to about 50% around a spectral line 52, and changes suddenly from about 50% to 100% around a spectral line 58. It is already known that specified frequency values of the ringtone of the United Kingdom of Great Britain and Northern Ireland are 400 Hz and 450 Hz, and frequency values corresponding to the spectral lines 52 and 58 are about 402.3 Hz and 449.2 Hz, which are located in neighboring areas of 400 Hz and 450 Hz.

There are two main aspects of reasons why a relatively small difference exists between the frequency value corresponding to the spectral line and the specified frequency value. First, distribution of the ringtone sequence at a particular frequency component has a width. Second, the distribution is limited to FFT transform precision. However, the frequency value corresponding to the spectral line is definitely distributed in a neighboring area of the particular frequency component, and does not affect signal detection.

303. Obtain a maximum value distribution characteristic of a frequency domain energy distribution derivative of the audio signal frame according to the frequency domain energy distribution of the audio signal frame.

To further highlight a distribution characteristic of the current frame of the audio signal in the frequency domain, step 303 may be calculating a derivative of a frequency domain energy distribution ratio of the current frame of the audio signal. The derivative of the frequency domain energy distribution ratio may be calculated using many methods, and the Lagrange numerical differential method is used an example herein for description.

Assuming that the audio signal is a current frame of an audio signal, and the current frame is the $k^{th}$ frame, a normal formula for calculating the derivative of the frequency domain energy distribution ratio of the current frame using the Lagrange numerical differential method is:

$$\text{ratio\_energy}'_k(f) = \left( \sum_{n=f-\frac{N-1}{2}}^{f+\frac{N-1}{2}} \left( \left( \prod_{\substack{i=f-\frac{N-1}{2} \\ i \neq n}}^{f+\frac{N-1}{2}} \frac{f-i}{n-i} \right) * \text{ratio\_energy}_k(n) \right) \right)' \quad (3)$$

where N represents a numerical differentiation order, ratio_energy$'_k$(f) represents a derivative of a frequency domain energy distribution ratio of the $k^{th}$ frame, ratio_energy$_k$(n) represents an energy distribution ratio of the $k^{th}$ frame, and $$f \in \left[ \frac{N-1}{2}, \left( F_{lim} - \frac{N-1}{2} \right) \right].$$

A value of N may be set according to experience, and for example, may be set to N=7, and the formula (3) is transformed into the following formula:

ratio_energy$'_k$(f)=−1/60 ratio_energy$_k$(f−3)+9/60 ratio_energy$_k$(f−2)−45/60 ratio_energy$_k$(f−1)+45/60 ratio_energy$_k$(f+1)−9/60 ratio_energy$_k$(f+2)+1/60 ratio_energy$_k$(f+3)

where f∈[3, (F/2−4)], and when f∈[0, 2] or f∈[(F/2−3), (F/2−1)], ratio_energy$'_k$(f) is set to 0.

Figure 6:
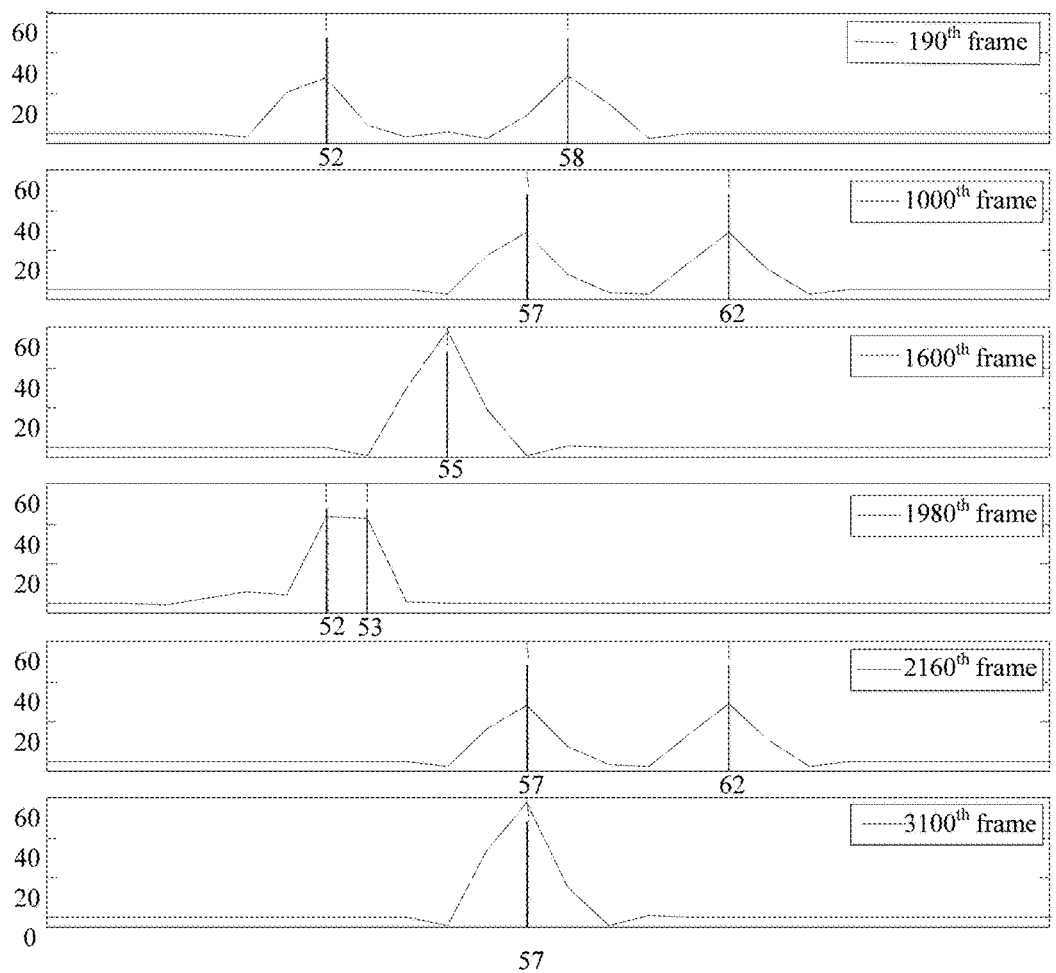
FIG. 6 is a schematic diagram of a derivative of a frequency domain energy distribution curve according to an embodiment.

For the frequency domain energy distribution curves of the $190^{th}$ frame, the $1000^{th}$ frame, the $1600^{th}$ frame, the $1980^{th}$ frame, the $2160^{th}$ frame, and the $3100^{th}$ frame shown in FIG. 5, from top to bottom, six subdiagrams in FIG. 6 respectively show derivatives of the frequency domain energy distribution curves. The lateral axis indicates a spectral line. For ease of showing, FIG. 5 shows the derivatives of the frequency domain energy distribution curves of spectral lines whose values are from 45 to 70. The longitudinal axis indicates a derivative value.

From comparison between FIG. 5 and FIG. 6, it can be learned that, if an energy distribution ratio of the frequency domain energy distribution ratio curve at a spectral line significantly increases, a maximum value of the derivative of the frequency domain energy distribution ratio definitely occurs at the spectral line. For the single-frequency signal, using the German ringtone in the third subdiagram as an example, the frequency domain energy distribution ratio changes suddenly from 0% to 100% around the spectral line 55; and correspondingly, the largest value of the derivative of the frequency domain energy distribution ratio occurs at the spectral line 55. For the dual-frequency signal, using the ringtone of the United Kingdom of Great Britain and Northern Ireland in the first subdiagram as an example, the energy distribution ratio changes suddenly from 0% to about 50% around the spectral line 52, and changes suddenly from about 50% to 100% around the spectral line 58; and correspondingly, the largest value and the second largest value of the derivative of the frequency domain energy distribution ratio also occur at the spectral lines 52 and 58.

Based on the derivative of the frequency domain energy distribution ratio of the audio signal frame, a maximum value distribution parameter of the derivative of the frequency domain energy distribution ratio is further extracted. The maximum value distribution parameter of the derivative of the frequency domain energy distribution ratio is represented using a parameter pos_max_L7_n, where n represents the $n^{th}$ largest value of the derivative of the frequency domain energy distribution ratio, and pos_max_L7_n represents a location of the $n^{th}$ greatest value of the derivative of the frequency domain energy distribution ratio at the spectral line.

In this embodiment, only distribution parameters of the largest value and the second largest value of the derivative of the frequency domain energy distribution ratio of the current frame of the audio signal are used an example for description, only pos_max_L7_1 and pos_max_L7_2 are extracted.

Figure 7:
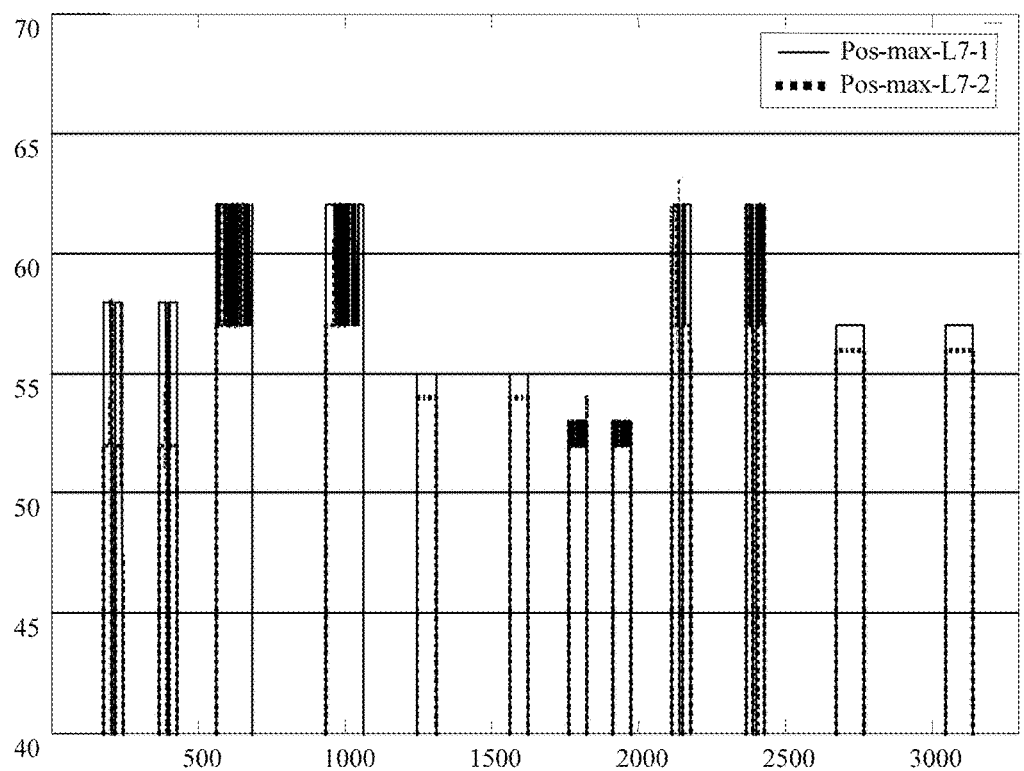
FIG. 7 is a schematic diagram of a maximum value distribution characteristic of a derivative of a frequency domain energy distribution ratio according to an embodiment.

For the standard ringtone sequence provided in FIG. 4A and FIG. 4B, FIG. 7 provides distribution characteristic curves of pos_max_L7_1 and pos_max_L7_2. A solid line represents pos_max_L7_1, a dotted line represents pos_max_L7_2; the lateral axis indicates a frame; the longitudinal axis indicates a spectral line location, and a value is [1, (F/2−1)]. For ease of showing, only the distribution characteristic curves of pos_max_L7_1 and pos_max_L7_2 of spectral lines whose values are between 40 to 70 are shown.

It can be learned from FIG. 7 that, for the single-frequency signal, using the third ringtone sequence being the German ringtone as an example, corresponding to a specified frequency value 425 Hz, pos_max_L7_1 is always located at the spectral line 55, and pos_max_L7_2 is located at the neighboring spectral line 54. For the dual-frequency signal, using the first ringtone sequence being the ringtone of the United Kingdom of Great Britain and Northern Ireland as an example, corresponding to the specified frequency values 400 Hz and 450 Hz, pos_max_L7_1 and pos_max_L7_2 are alternately located at the spectral line 52 or the spectral line 58. Therefore, using step 302 and step 303, the frequency domain energy distribution characteristic of the audio signal is represented using the maximum value distribution characteristic of the derivative of the frequency domain energy distribution ratio.

Step 304. Use the audio signal frame and each frame in a preset neighborhood range of the audio signal frame as a frame set, where the frame set includes a to-be-detected frame.

When the audio signal is detected, although each frame of the audio signal is detected, each frame and related parameters of multiple neighboring frames need to be analyzed together, so that a detection result of each frame can be obtained. Therefore, a maximum value distribution characteristic of a derivative of a frequency domain energy distribution ratio of each frame, including the to-be-detected frame, in the frame set needs to be obtained using step 302 and step 303.

Step 305. Detect the to-be-detected frame according to a maximum value distribution characteristic of a frequency domain energy distribution derivative of the frame set.

The reason why a to-be-detected audio signal can be differentiated from another audio signal is that the to-be-detected audio signal has a characteristic different from that of another audio signal in terms of frequency domain energy distribution. Further, the characteristic may also be represented in the maximum value distribution characteristic of the derivative of the frequency domain energy distribution ratio. Therefore, the audio signal may be detected by analyzing the maximum value distribution characteristic of the derivative of the frequency domain energy distribution ratio.

If a quantity of frames in which the maximum value distribution characteristic of the frequency domain energy distribution derivative in the frame set is in a first interval is greater than or equal to a first threshold, the to-be-detected frame is a standard to-be-detected signal, or if the to-be-detected frame does not meet the foregoing condition, but a quantity of frames in which the maximum value distribution characteristic of the frequency domain energy distribution derivative in the frame set is in a second interval is greater than or equal to a second threshold, the to-be-detected frame is an abnormal to-be-detected signal.

This embodiment is described using an example in which a ringtone is detected. First, time domain energy distribution is detected, and frequency domain energy distribution is further detected based on that the time domain energy distribution is satisfied.

Figure 8:
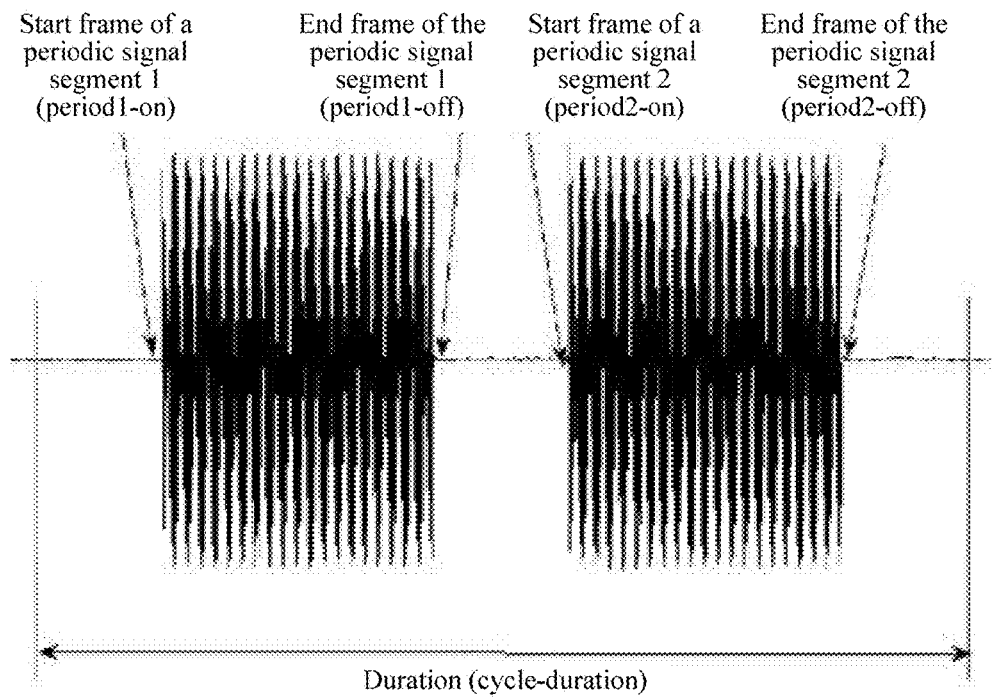
FIG. 8 is a schematic diagram of a standard ringtone according to an embodiment.

In the time domain, a complete ringtone signal may include one periodic signal, a silence segment+a periodic signal segment 1+a silence segment, or may include two periodic signals, a silence segment+a periodic signal segment 1+a silence segment+a periodic signal segment 2+a silence segment. Using a standard ringtone shown in FIG. 8 as an example, assuming that complete ringtone duration is a cycle-duration frame, a start location of the periodic signal segment 1 is the (period1-on)$^{th}$ frame, an end location is the (period1-off)$^{th}$ frame, a start location of the periodic signal segment 2 is the (period2-on)$^{th}$ frame, and an end location is the (period2-off)$^{th}$ frame. For ringtones in different countries and regions, values of cycle-duration, period1-on, period1-off, possible period2-on, and possible period2-off are all different.

Assuming that the audio signal frame is a current frame of an audio signal, and the current frame is a $k^{th}$ frame, it is detected whether the time domain energy distribution meets the following requirement detecting whether a possible periodic signal segment 1, the k-cycle_duration+period1_on$^{th}$ frame to the k-cycle_duration+period1_off$^{th}$ frame, has relatively large energy; if the to-be-detected ringtone has a second periodic signal, detecting whether a possible periodic signal segment 2, the k-cycle_duration+period2_on$^{th}$ frame to the k-cycle_duration+period2$_{13}$ off$^{th}$ frame, has relatively large energy; and detecting whether the rest frames are in the silence segment, whether energy of the rest frames is small enough.

If the foregoing time domain energy distribution condition is met, it indicates that a signal from the k-cycle_duration$^{th}$ frame to the k$^{th}$ frame may be a complete ringtone signal. A periodic signal segment in the signal is used as a frame set, and it is determined, by analyzing the maximum value distribution characteristic of the frequency domain energy distribution derivative, whether the segment of signal is a to-be-detected ringtone signal.

It should be noted that, an objective of first detecting time domain energy distribution is, if time domain energy distribution of the to-be-detected signal obviously already does not meet a requirement of a particular type of standard ringtone, it may be determined that the signal is not the ringtone signal to be identified, and it is unnecessary to perform frequency domain energy analysis, which may effectively reduce algorithm complexity. However, detection on time domain energy distribution is only a preliminary detection step, and detection on a frequency domain energy distribution characteristic is a key step of this solution. On one hand, different from the ringtone signal, many to-be-detected signals do not have fixed specifications in time domain energy distribution, and preliminary detection cannot be performed by detecting time domain energy distribution; on the other hand, even for a ringtone signal, it is impossible to identify a normal signal and an abnormal signal by means of only time domain analysis.

Frequency domain energy distribution may be divided into the following four cases for description.

A standard single-frequency ringtone signal.

It is assumed that a symbol && represents a relationship "and", and a symbol || represents a relationship "or". For the frame set corresponding to the to-be-detected frame, detection steps are sequentially detecting whether pos_max_L7_1 and pos_max_L7_2 meet a condition:

(pos_max_$L7\_1$==$f$)&&(pos_max_$L7\_2$==$f$-1);

counting a quantity of frames that meet a condition a, and denoting the quantity as num_pos; and detecting whether num_pos meets a condition num_pos≥N1, where if the condition is met, the to-be-detected frame is a to-be-identified standard single-frequency signal.

f and f−1 are first interval parameters for the standard single-frequency signal, and N1 is a first threshold. For single-frequency ringtones of different types, values of f and N1 are different. The value of N1 is related to ringtone specifications of different types, and the value of f is related to the ringtone specifications of different types, a sampling rate, and an FFT transform size.

Figure 9:
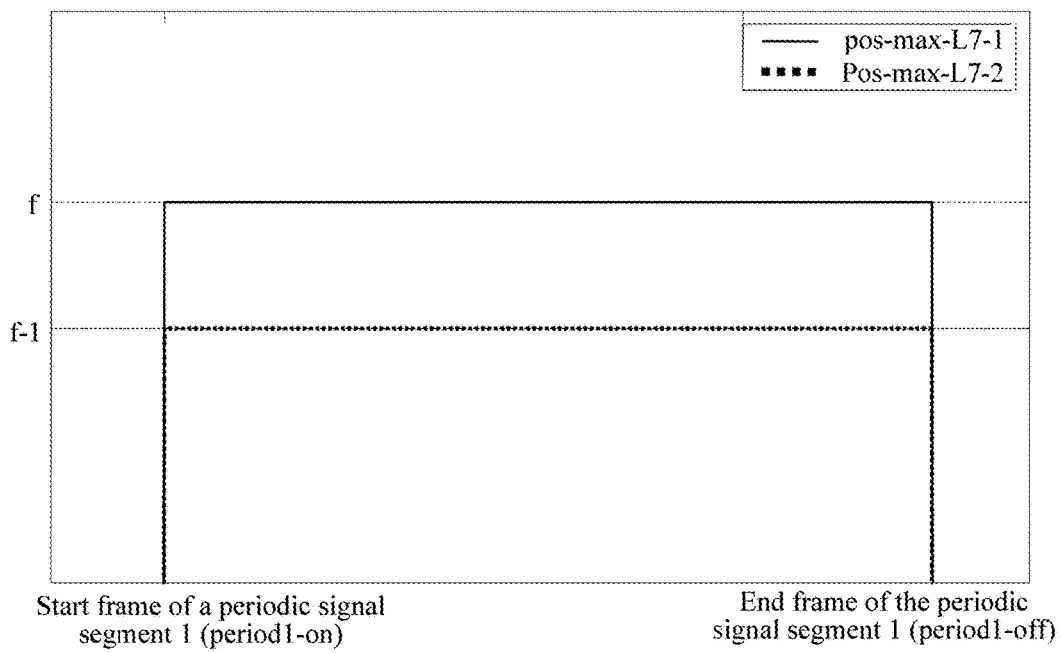
FIG. 9 is a schematic diagram of detection on a standard single-frequency ringtone according to an embodiment.
Figure 10:
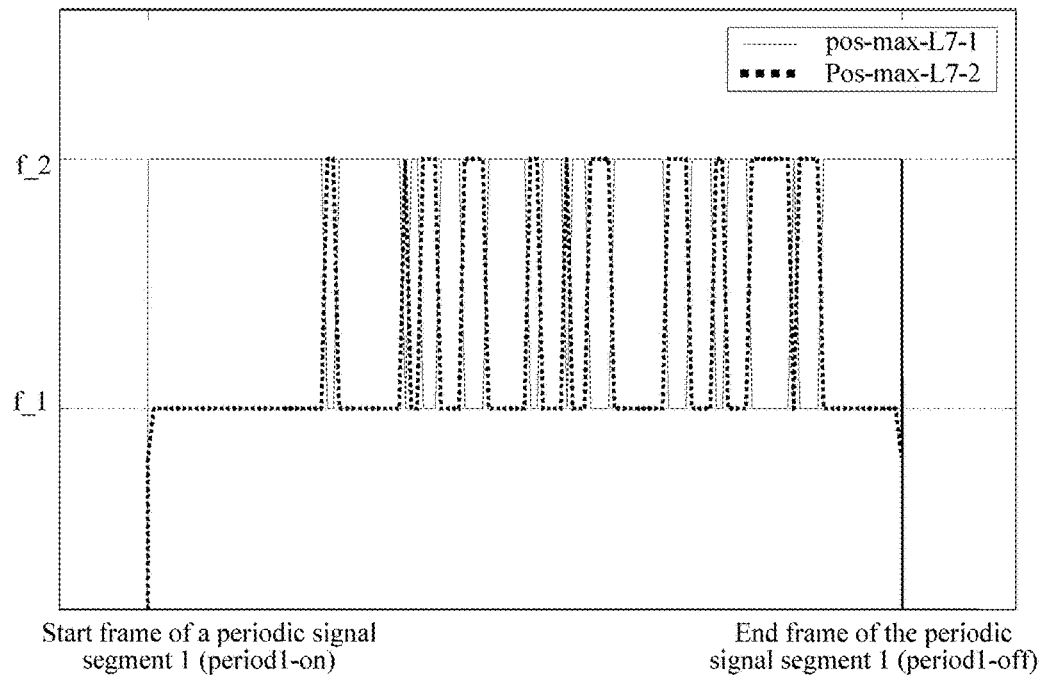
FIG. 10 is a schematic diagram of detection on a standard dual-frequency ringtone according to an embodiment.

For a standard single-frequency ringtone signal, FIG. 9 provides pos_max_L7_1 and pos_max_L7_2 distribution characteristic curves of a periodic signal segment. A solid line represents pos_max_L7_1, a dotted line represents pos_max_L7_2; the lateral axis indicates a frame; and the longitudinal axis indicates a spectral line location. It can be learned from FIG. 7 that, in a periodic signal segment, pos_max_L7_1 is always distributed at a spectral line f, and pos_max_L7_2 is always distributed at a spectral line f-1. In this embodiment, it is assumed that the sampling rate is 8 kHz, and the FFT transform size is 1024. Using the German ringtone as an example, f is set to 55.

A standard dual-frequency ringtone signal.

For the frame set corresponding to the to-be-detected frame, detection steps are sequentially detecting whether pos_max_L7_1 and pos_max_L7_2 meet a condition:

((pos_max_$L7\_1$==$f\_1$)&&(pos_max_$L7\_2$==$f\_2$))||
((pos_max_$L7\_1$==$f\_2$)&&
(pos_max_$L7\_2$==$f\_1$));

counting a quantity of frames that meet a condition a, and denoting the quantity as num_pos; and detecting whether num_pos meets a condition num_pos≥N1, where if the condition is met, the to-be-detected frame is a to-be-identified standard dual-frequency signal.

f_1 and f_2 are first interval parameters for the standard dual-frequency signal, and N1 is a first threshold. For dual-frequency ringtones of different types, values of f_1, f_2, and N1 are different. The value of N1 is related to ringtone specifications of different types, and the values of f_1 and f_2 are related to the ringtone specifications of different types, a sampling rate, and an FFT transform size.

For a standard dual-frequency ringtone signal, FIG. 9 provides pos_max_L7_1 and pos_max_L7_2 distribution characteristic curves of a periodic signal segment. A solid line represents pos_max_L7_1, a dotted line represents pos_max_L7_2; the lateral axis indicates a frame; and the longitudinal axis indicates a spectral line location. It can be learned from FIG. 7 that, in the periodic signal segment, except a start location and an ending location, pos_max_L7_1 and pos_max_L7_2 are distributed in either a spectral line f_1 or a spectral line f_2. In addition, when pos_max_L7_1 is distributed at the spectral line f_1, pos_max_L7_2 is distributed at the spectral line f_2; and when pos_max_L7_1 is distributed at the spectral line f_2, pos_max_L7_2 is distributed at the spectral line f_1. In this embodiment, it is assumed that the sampling rate is 8 kHz, and the FFT transform size is 1024. Using the ringtone of the United Kingdom of Great Britain and Northern Ireland as an example, f_1 is set to 52, and f_2 is set to 58.

An abnormal single-frequency ringtone signal.

For the frame set corresponding to the to-be-detected frame, detection steps are sequentially detecting whether pos_max_L7_1 and pos_max_L7_2 do not meet the following condition:

(pos_max_$L7\_1$==$f$)&&(pos_max_$L7\_2$==$f$-1);

sequentially detecting whether pos_max_L7_1 and pos_max_L7_2 meet the following condition:

(pos_max_$L7\_1$∈[$f$−$df$, $f$+$df$])&&(pos_max_$L7\_2$∈ [$f$−$df$, $f$+$df$]);

counting a quantity of frames that meet both conditions a and b, and denoting the quantity as num_pos; and detecting whether num_pos meets a condition num_pos≥N2, where if the condition is met, the to-be-detected frame is a to-be-identified abnormal single-frequency signal.

f−df and f+df are second interval parameters for the abnormal single-frequency signal, and N2 is a second threshold. For single-frequency ringtones of different types, values of f and N2 are different. The value of N2 is related to ringtone specifications of different types, and the value of f is related to the ringtone specifications of different types, a sampling rate, and an FFT transform size.

An abnormal dual-frequency ringtone signal.

For the frame set corresponding to the to-be-detected frame, detection steps are sequentially detecting whether pos_max_L7_1 and pos_max_L7_2 do not meet the following condition:

(pos_max_$L7\_1$==$f\_1$)&&(pos_max_$L7\_2$==$f\_2$),
or (pos_max_$L7\_1$==$f\_2$)&&(pos_max_$L7\_2$==$f\_1$);

sequentially detecting whether pos_max_L7_1 and pos_max_L7_2 meet the following condition:

(pos_max_$L7\_1 \in [f\_1-df, f\_2+df])$&&
(pos_max_$L7\_2 \in [f\_1-df, f\_2+df])$, counting a quantity of frames that meet conditions a and b, and denoting the quantity as num_pos; and detecting whether num_pos meets a condition num_pos≥N2, where if the condition is met, the to-be-detected frame is a to-be-identified abnormal double-frequency signal.

f_1−df and f_2+df are second interval parameters for the abnormal dual-frequency signal, and N2 is a second threshold. For dual-frequency ringtones of different types, values of f_1, f_2, and N2 are different. The value of N2 is related to ringtone specifications of different types, and the values of f_1 and f_2 are related to the ringtone specifications of different types, a sampling rate, and an FFT transform size.

Figure 11:
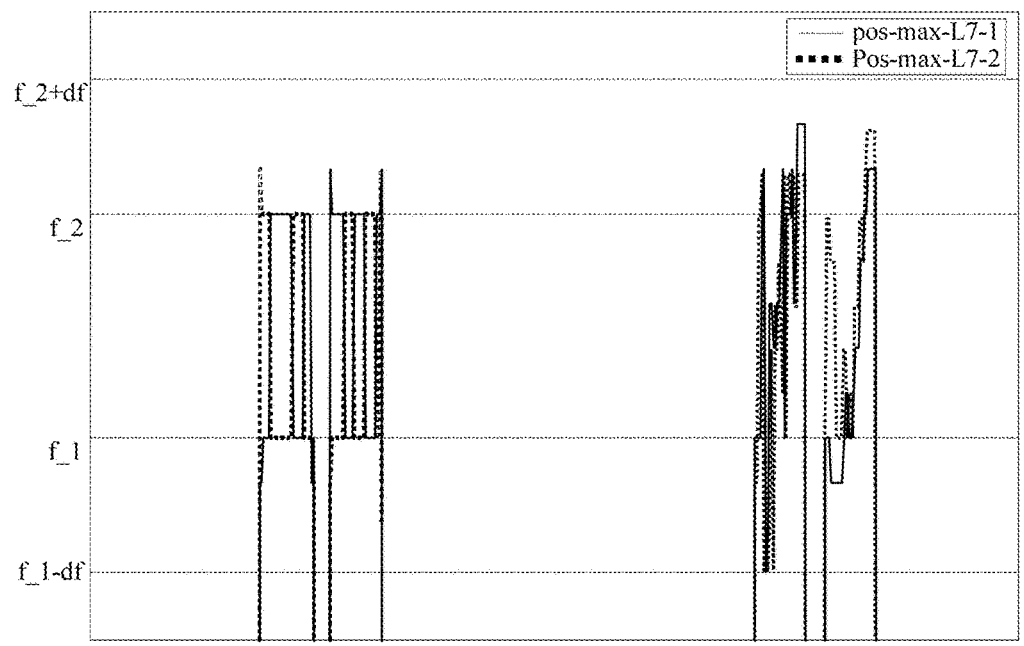
FIG. 11 is a schematic diagram of detection on an abnormal ringtone according to an embodiment.

Using the abnormal dual-frequency signal as an example, FIG. 11 is a schematic diagram of detection on an abnormal ringtone. A solid line represents pos_max_L7_1, a dotted line represents pos_max_L7_2; the lateral axis indicates a frame; and the longitudinal axis indicates a spectral line location. The first half part provides pos_max_L7_1 and pos_max_L7_2 of a standard signal, and the second half part provides pos_max_L7_1 and pos_max_L7_2 of an abnormal signal. It can be learned from FIG. 11 that, distribution characteristics of pos_max_L7_1 and pos_max_L7_2 of the standard signal in the first half part meet a detection condition of a standard ringtone. Although distribution characteristics of pos_max_L7_1 and pos_max_L7_2 of the abnormal signal in the second half part already do not meet the detection condition of the standard ringtone, compared with another signal, the distribution is still in a limited range.

This embodiment is described using detection on a ringtone signal as an example, so that a standard ringtone and noise can be detected.

The following are apparatus embodiments of the present disclosure. The apparatus embodiments of the present disclosure are used to perform methods implemented in the first method embodiment and the second method embodiment of the present disclosure. For ease of description, only a part related to this embodiment of the present disclosure is shown, and for undisclosed technical details, refer to the first embodiment and the second embodiment of the present disclosure.

Figure 12:
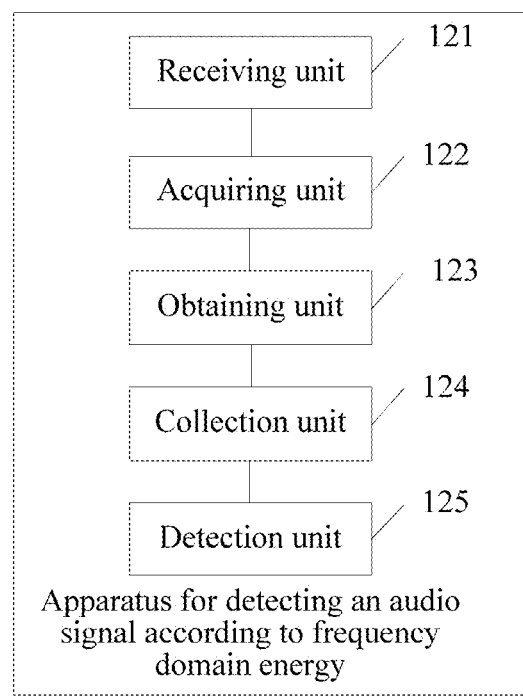
FIG. 12 is a schematic structural diagram of an apparatus for detecting an audio signal according to frequency domain energy according to an embodiment of the present disclosure.

Referring to FIG. 12, FIG. 12 is a schematic structural diagram of an apparatus for detecting an audio signal according to frequency domain energy according to an embodiment of the present disclosure. As shown in FIG. 12, the apparatus includes a receiving unit 121, an acquiring unit 122, an obtaining unit 123, a collection unit 124, and a detection unit 125.

The receiving unit 121 is configured to receive an audio signal frame.

The receiving unit 121 may receive the audio signal frame using a network, or receive the audio signal frame using a recording apparatus.

Optionally, the audio signal frame may be an audio signal frame in any audio signal that can be processed in an electronic device, for example, a voice signal, a ringtone signal, a DTMF signal, or a FSK signal. The ringtone signal may include a ringback tone, a standard ringtone, and an abnormal ringtone. In addition, the audio signal frame may be an audio signal frame at any location in a to-be-detected audio signal, for example, may be a start frame of the to-be-detected audio signal, or may be a signal frame in a middle part of the to-be-detected audio signal, or may be an end frame of the to-be-detected audio signal.

The acquiring unit 122 is configured to acquire frequency domain energy distribution of the audio signal frame, where the frequency domain energy distribution represents an energy distribution characteristic of the audio signal frame in a frequency domain.

The obtaining unit 123 is configured to obtain a maximum value distribution characteristic of a frequency domain energy distribution derivative of the audio signal frame according to the frequency domain energy distribution of the audio signal frame.

The collection unit 124 is configured to use the audio signal frame and each frame in a preset neighborhood range of the audio signal frame as a frame set, where the frame set includes a to-be-detected frame.

Optionally, the preset neighborhood range may be a preset range of a quantity of frames. For example, the frame in the preset neighborhood range of the audio signal frame may refer to a particular quantity of audio signal frames adjacent to the audio signal frame, so that the frame set includes the audio signal frame and the particular quantity of the audio signal frames adjacent to the audio signal frame. Alternatively, the preset neighborhood range may be a preset time range. For example, the frame in the preset neighborhood range of the audio signal frame may refer to an audio signal frame that is adjacent to the audio signal frame and that is received in a particular time, so that the frame set includes the audio signal frame and the audio signal frame that is adjacent to the audio signal frame and that is received in the particular time. The to-be-detected frame may be one or more audio signal frames included in the frame set.

The detection unit 125 is configured to detect the to-be-detected frame according to a maximum value distribution characteristic of a frequency domain energy distribution derivative of the frame set.

The maximum value distribution characteristic of the frequency domain energy distribution derivative of the frame set may refer to maximum value distribution characteristics of frequency domain energy distribution derivatives of one or more audio signal frames in the frame set, or the maximum value distribution characteristic of the frequency domain energy distribution derivative of the frame set may refer to a maximum value distribution characteristic of a frequency domain energy distribution derivative of each audio signal frame in the frame set.

In another embodiment, the detection unit 125 may perform audio signal classification detection on the to-be-detected frame, or the detection unit 125 may perform audio signal characteristic detection on the to-be-detected frame, or the like.

Optionally, the acquiring unit 122 may be configured to acquire a ratio of a sum of energy of the audio signal frame in any range in a specified frequency domain range to total energy of the audio signal frame in the specified frequency domain range, where the ratio represents the frequency domain energy distribution of the audio signal frame.

The specified frequency domain range may be set in advance. In addition, multiple frequency domain ranges may be set in advance.

In this implementation manner, the acquiring unit 122 may be configured to perform Fourier transform on the audio signal frame, to obtain a frequency domain signal; and obtain the frequency domain energy distribution ratio according to $$\text{ratio\_energy}_k(f) = \frac{\sum_{i=0}^{f}(\text{Re\_fft}^2(i) + \text{Im\_fft}^2(i))}{\sum_{i=0}^{(F_{lim}-1)}(\text{Re\_fft}^2(i) + \text{Im\_fft}^2(i))} \times 100\%,$$

$$f \in [0, (F_{lim} - 1)]$$

where f represents a quantity of spectral lines, $f \in [0, (F_{lim}-1)]$, it is assumed that an FFT transform size is F, $F_{lim} \leq F/2$, Re_fft(i) represents a real part of an FFT transform result, Im_fft(i) represents an imaginary part of the FFT transform result, $$\sum_{i=0}^{(F_{lim}-1)}(\text{Re\_fft}^2(i) + \text{Im\_fft}^2(i))$$

represents a sum of energy of the audio signal frame in a frequency domain range corresponding to $$f \in [0, (F_{lim} - 1)], \text{ and } \sum_{i=0}^{f}(\text{Re\_fft}^2(i) + \text{Im\_fft}^2(i))$$

represents total energy of the audio signal frame in a frequency domain range corresponding to 0~f.

Figure 13:
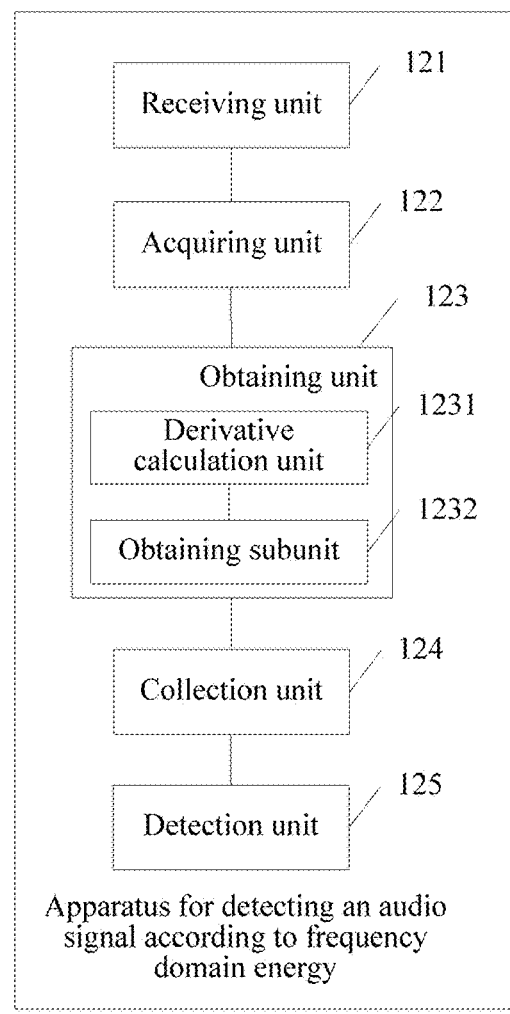
FIG. 13 is a schematic structural diagram of another apparatus for detecting an audio signal according to frequency domain energy according to an embodiment of the present disclosure.

In another embodiment, as shown in FIG. 13, the obtaining unit 123 may include a derivative calculation unit 1231 configured to calculate a derivative of the frequency domain energy distribution ratio, to obtain a frequency domain energy distribution derivative; and an obtaining subunit 1232 configured to obtain the maximum value distribution characteristic of the frequency domain energy distribution derivative of the audio signal frame according to the frequency domain energy distribution derivative.

The derivative calculation unit 1231 calculates the derivative of the frequency domain energy distribution ratio using a differential operation, to obtain the frequency domain energy distribution derivative. For example, the derivative calculation unit 1231 may calculate the derivative of the frequency domain energy distribution ratio using the Lagrange numerical differential method.

Optionally, that the derivative calculation unit 1231 calculates the derivative of the frequency domain energy distribution ratio, to obtain the frequency domain energy distribution derivative includes:

$$\text{ratio\_energy}'_k(f) = \left( \sum_{n=f-\frac{N-1}{2}}^{f+\frac{N-1}{2}} \left( \left( \prod_{\substack{i=f-\frac{N-1}{2} \\ i \neq n}}^{f+\frac{N-1}{2}} \frac{f-i}{n-i} \right) * \text{ratio\_energy}_k(n) \right) \right)'$$

$$f \in \left[ \frac{N-1}{2}, \left(F_{lim} - \frac{N-1}{2}\right) \right],$$

where N represents a numerical differentiation order, ratio_energy'$_k$(f) represents a derivative of an energy distribution ratio of the $k^{th}$ frame, ratio_energy$_k$(n) represents the energy distribution ratio of the $k^{th}$ frame, and $$f \in \left[ \frac{N-1}{2}, \left(F_{lim} - \frac{N-1}{2}\right) \right].$$

The frequency domain energy distribution derivative may be obtained using the foregoing formula.

Optionally, the obtaining subunit 1232 may be configured to acquire at least one maximum value in derivative values of energy distribution parameters; and obtain the maximum value distribution characteristic of the frequency domain energy distribution derivative of the audio signal frame according to a location of each maximum value at a spectral line.

The at least one maximum value may be one or more top-ranked derivative values obtained after at least one derivative value of the energy distribution parameter is sorted in descending order. For example, when the at least one maximum value represents one maximum value, the at least one maximum value may be the largest value in the derivative values of the energy distribution parameters, or when the at least one maximum value represents two maximum values, the at least one maximum value may include the largest value and the second largest value in the derivative values of the energy distribution parameters in the derivative values of the energy distribution parameters.

Because the location of each maximum value at the spectral line is obtained, the maximum value distribution characteristic of the frequency domain energy distribution derivative of the audio signal frame may be obtained. For example, the maximum value distribution characteristic of the frequency domain energy distribution derivative of the audio signal frame may include a location of at least one maximum value in the derivative values of the energy distribution parameters of the audio signal frame at the spectral line.

In another embodiment, the detection unit 125 may be configured to, if a quantity of parameters that are in a preset first interval and in maximum value distribution parameters of the frequency domain energy distribution derivative of the frame set is greater than or equal to a first threshold, determine that the to-be-detected frame is a standard to-be-detected signal, or if the to-be-detected frame is not a standard to-be-detected signal but a quantity of parameters that are in a preset second interval and in maximum value distribution parameters of the frequency domain energy distribution derivative of the frame set is greater than or equal to a second threshold, determine that the to-be-detected frame is an abnormal to-be-detected signal.

Optionally, the maximum value distribution parameter of the frequency domain energy distribution derivative of the frame set may refer to a maximum value distribution parameter of a frequency domain energy distribution derivative of each audio signal frame in the frame set. In addition, the maximum value distribution parameter of the frequency domain energy distribution derivative may be a parameter used to represent a maximum value distribution characteristic of the frequency domain energy distribution derivative. In addition, the first interval may be a preset parameter interval corresponding to the standard to-be-detected signal, for example, a preset spectral line location interval corresponding to the standard to-be-detected signal. The first threshold may be a preset threshold corresponding to the standard to-be-detected signal. The second interval may be a preset parameter interval corresponding to the abnormal to-be-detected signal, for example, a preset spectral line location interval corresponding to the abnormal to-be-detected signal. The second threshold may be a preset threshold corresponding to the abnormal to-be-detected signal. In addition, an interval range of the second interval may be greater than or equal to an interval range of the first interval.

In this implementation manner, it may be detected first whether the to-be-detected frame is a standard to-be-detected signal, and if yes, it is determined that the to-be-detected frame is a standard to-be-detected signal, or if not, it is detected whether the to-be-detected frame is an abnormal to-be-detected signal. Therefore, a standard to-be-detected signal and an abnormal to-be-detected signal can be detected.

Optionally, the foregoing apparatus may be applied to any electronic device having a function of computing and playing an audio signal, for example, a tablet computer, a mobile phone, an e-reader, a remote controller, a PC, a notebook computer, an on-board equipment, a web television, a wearable device, a network device, a server, a base station, and a UMG.

In this embodiment, after an audio signal frame is received, frequency domain energy distribution of the audio signal frame is acquired; a maximum value distribution characteristic of a frequency domain energy distribution derivative of the audio signal frame is obtained according to the frequency domain energy distribution of the audio signal frame, and the audio signal frame and each frame in a preset neighborhood range of the audio signal frame are used as a frame set, where the frame set includes a to-be-detected frame. In this way, the to-be-detected frame can be detected according to a maximum value distribution characteristic of a frequency domain energy distribution derivative of the frame set. Therefore, detection on an audio signal can be implemented in the present disclosure.

Figure 14:
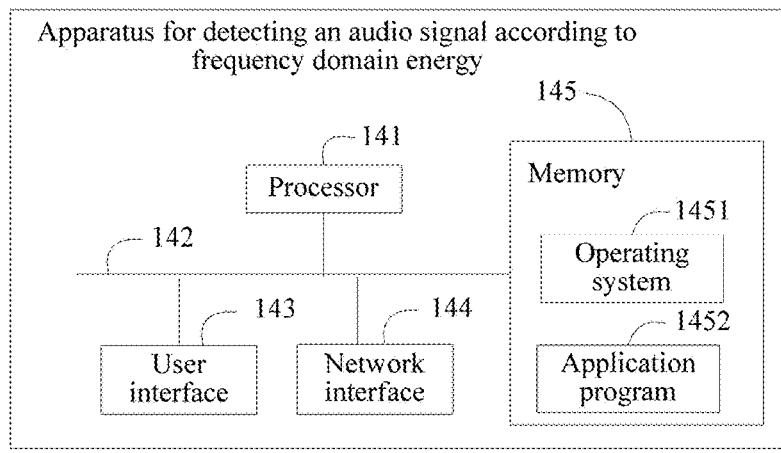
FIG. 14 is a schematic structural diagram of another apparatus for detecting an audio signal according to frequency domain energy according to an embodiment of the present disclosure.

Referring to FIG. 14, FIG. 14 is a schematic structural diagram of another apparatus for detecting an audio signal according to frequency domain energy according to an embodiment of the present disclosure. As shown in FIG. 14, the apparatus includes at least one processor 141, for example, a central processing unit (CPU), at least one network interface 144 or another user interface 143, a memory 145, and at least one communications bus 142. The communications bus 142 is configured to implement connection and communication between these components. A computing node 140 optionally includes the user interface 143, including a display, a keyboard, or a clicking device (for example, a mouse, a trackball, a touch plane, or a touch display screen). The memory 145 may include a high-speed random access memory (RAM) memory, and may further include a non-volatile memory, for example, at least one magnetic disk storage. The memory 145 may optionally include at least one storage apparatus far away from the processor 141.

In some implementation manners, the memory 145 stores the following elements, and an executable module or a data structure, or a subset thereof, or an extension set thereof, an operating system 1451, including various system programs and used to implement various basic services and process a hardware-based task, and an application program module 1452, including various application programs and used to implement various application services.

In this embodiment of the present disclosure, by invoking a program or an instruction stored in the memory 145, the processor 141 is configured to receive an audio signal frame; acquire frequency domain energy distribution of the audio signal frame, where the frequency domain energy distribution represents an energy distribution characteristic of the audio signal frame in a frequency domain; obtain a maximum value distribution characteristic of a frequency domain energy distribution derivative of the audio signal frame according to the frequency domain energy distribution of the audio signal frame; use the audio signal frame and each frame in a preset neighborhood range of the audio signal frame as a frame set, where the frame set includes a to-be-detected frame; and detect the to-be-detected frame according to a maximum value distribution characteristic of a frequency domain energy distribution derivative of the frame set.

In another embodiment, in the method for detecting an audio signal, that the processor 141 executes the operation of acquiring frequency domain energy distribution of the audio signal frame may include acquiring a ratio of a sum of energy of the audio signal frame in any range in a specified frequency domain range to total energy of the audio signal frame in the specified frequency domain range, where the ratio represents the frequency domain energy distribution of the audio signal frame.

Optionally, that the processor 141 executes the operation of acquiring a ratio of a sum of energy of the audio signal frame in any range in a specified frequency domain range to total energy of the audio signal frame in the specified frequency domain range may include performing Fourier transform on the audio signal frame to obtain a frequency domain signal; obtaining the frequency domain energy distribution ratio according to $$\text{ratio\_energy}_k(f) = \frac{\sum_{i=0}^{f}(\text{Re\_fft}^2(i) + \text{Im\_fft}^2(i))}{\sum_{i=0}^{(F_{lim}-1)}(\text{Re\_fft}^2(i) + \text{Im\_fft}^2(i))} \times 100\%,$$

$$f \in [0, (F_{lim} - 1)]$$

where f represents a quantity of spectral lines, $f \in [0, (F_{lim}-1)]$, it is assumed that an FFT transform size is F, $F_{lim \leq F/2}$, Re_fft(i) represents a real part of an FFT transform result, Im_fft(i) represents an imaginary part of the FFT transform result, $$\sum_{i=0}^{(F_{lim}-1)}(\text{Re\_fft}^2(i) + \text{Im\_fft}^2(i))$$

represents a sum of energy of the audio signal frame in a frequency domain range corresponding to $$f \in [0, (F_{lim}-1)], \text{ and } \sum_{i=0}^{f}(\text{Re\_fft}^2(i) + \text{Im\_fft}^2(i))$$

represents total energy of the audio signal frame in a frequency domain range corresponding to 0~f.

In another embodiment, that the processor 141 executes the operation of acquiring a maximum value distribution characteristic of a frequency domain energy distribution derivative of the audio signal frame according to the frequency domain energy distribution of the audio signal frame may include calculating a derivative of the frequency domain energy distribution ratio, to obtain a frequency domain energy distribution derivative; and obtaining the maximum value distribution characteristic of the frequency domain energy distribution derivative of the audio signal frame according to the frequency domain energy distribution derivative.

Optionally, that the processor 141 executes the operation of calculating a derivative of the frequency domain energy distribution ratio, to obtain a frequency domain energy distribution derivative may include:

$$\text{ratio\_energy}'_k(f) = \left( \sum_{n=f-\frac{N-1}{2}}^{f+\frac{N-1}{2}} \left( \left( \prod_{\substack{i=f-\frac{N-1}{2} \\ i \neq n}}^{f+\frac{N-1}{2}} \frac{f-i}{n-i} \right) * \text{ratio\_energy}_k(n) \right) \right)',$$

$$f \in \left[ \frac{N-1}{2}, \left( F_{lim} - \frac{N-1}{2} \right) \right]$$

where N represents a numerical differentiation order, ratio_energy$'_k$(f) represents a derivative of an energy distribution ratio of the $k^{th}$ frame, ratio_energy$_k$(n) represents the energy distribution ratio of the $k^{th}$ frame, and $$f \in \left[ \frac{N-1}{2}, \left( F_{lim} - \frac{N-1}{2} \right) \right].$$

Optionally, that the processor 141 executes the operation of obtaining the maximum value distribution characteristic of the frequency domain energy distribution derivative of the audio signal frame according to the frequency domain energy distribution derivative may include acquiring at least one maximum value in derivative values of energy distribution parameters; and obtaining the maximum value distribution characteristic of the frequency domain energy distribution derivative of the audio signal frame according to a location of each maximum value at a spectral line.

In another embodiment, that the processor 141 executes the operation of detecting the to-be-detected frame according to a maximum value distribution characteristic of a frequency domain energy distribution derivative of the frame set may include, if a quantity of parameters that are in a preset first interval and in maximum value distribution parameters of the frequency domain energy distribution derivative of the frame set is greater than or equal to a first threshold, determining that the to-be-detected frame is a standard to-be-detected signal, or if the to-be-detected frame is not a standard to-be-detected signal but a quantity of parameters in a preset second interval in a maximum value distribution parameter of the frequency domain energy distribution derivative of the frame set is greater than or equal to a second threshold, determining that the to-be-detected frame is an abnormal to-be-detected signal.

Optionally, the apparatus may be applied to any electronic device having a function of computing and playing an audio signal, for example, a tablet computer, a mobile phone, an e-reader, a remote controller, a PC, a notebook computer, an on-board equipment, a web television, a wearable device, a network device, a server, a base station, and a UMG.

In the technical solutions, after an audio signal frame is received, frequency domain energy distribution of the audio signal frame is acquired; a maximum value distribution characteristic of a frequency domain energy distribution derivative of the audio signal frame is obtained according to the frequency domain energy distribution of the audio signal frame, and the audio signal frame and each frame in a preset neighborhood range of the audio signal frame are used as a frame set, where the frame set includes a to-be-detected frame. In this way, the to-be-detected frame can be detected according to a maximum value distribution characteristic of a frequency domain energy distribution derivative of the frame set. Therefore, detection on an audio signal can be implemented in the present disclosure.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a RAM.

The foregoing disclosed descriptions are merely exemplary embodiments of the present disclosure, but are not intended to limit the scope of the claims of the present disclosure. Therefore, equivalent variations made according to the claims of the present disclosure shall fall within the scope of the present disclosure.

What is claimed is:

1. A method for detecting an audio signal according to frequency domain energy, the method comprising:
   receiving an audio signal frame;
   acquiring frequency domain energy distribution of the audio signal frame, the frequency domain energy distribution representing an energy distribution characteristic of the audio signal frame in a frequency domain;
   obtaining a maximum value distribution characteristic of a frequency domain energy distribution derivative of the audio signal frame according to the frequency domain energy distribution of the audio signal frame;
   using the audio signal frame and each frame in a preset neighborhood range of the audio signal frame as a frame set, the frame set comprising a to-be-detected frame;
   detecting the to-be-detected frame according to a maximum value distribution characteristic of a frequency domain energy distribution derivative of the frame set;
   determining whether the audio signal is a ringtone by analyzing the maximum value distribution characteristic of the frequency domain energy distribution derivative; and
   identifying a country of origin of the audio signal based on the frequency domain energy distribution of the audio signal frame when the audio signal is a ringtone.

2. The method of claim 1, wherein acquiring frequency domain energy distribution of the audio signal frame comprises acquiring a ratio of a sum of energy of the audio signal frame in any range in a specified frequency domain range to total energy of the audio signal frame in the specified frequency domain range, and the ratio represents the frequency domain energy distribution of the audio signal frame.

3. The method of claim 2, wherein acquiring the ratio of the sum of energy of the audio signal frame in any range in the specified frequency domain range to total energy of the audio signal frame in the specified frequency domain range comprises:
   performing Fourier transform on the audio signal frame to obtain a frequency domain signal; and
   obtaining the frequency domain energy distribution ratio according to $$\text{ratio\_energy}_k(f) = \frac{\sum_{i=0}^{f}(\text{Re\_fft}^2(i) + \text{Im\_fft}^2(i))}{\sum_{i=0}^{(F_{lim}-1)}(\text{Re\_fft}^2(i) + \text{Im\_fft}^2(i))} \times 100\%,$$

$$f \in [0, (F_{lim} - 1)]$$

ratio_energy$_k$(f) representing the frequency domain energy distribution ratio, f representing a quantity of spectral lines, f∈[0, ($F_{lim}$−1)], it is assumed that a fast Fourier transform (FFT) transform size is F, $F_{lim} \le F/2$, Re_fft(i) representing a real part of an FFT transform result, Im_fft(i) representing an imaginary part of the FFT transform result, $$\sum_{i=0}^{(F_{lim}-1)}(\text{Re\_fft}^2(i) + \text{Im\_fft}^2(i))$$

representing a sum of energy of the audio signal frame in a frequency domain range corresponding to $$f \in [0, (F_{lim} - 1)], \text{ and } \sum_{i=0}^{f}(\text{Re\_fft}^2(i) + \text{Im\_fft}^2(i))$$

representing total energy of the audio signal frame in a frequency domain range corresponding to 0~f.

4. The method of claim 2, wherein obtaining the maximum value distribution characteristic of the frequency domain energy distribution derivative of the audio signal frame according to the frequency domain energy distribution of the audio signal frame comprises:

calculating a derivative of the frequency domain energy distribution ratio in order to obtain a frequency domain energy distribution derivative; and obtaining the maximum value distribution characteristic of the frequency domain energy distribution derivative of the audio signal frame according to the frequency domain energy distribution derivative.

5. The method of claim 4, wherein calculating the derivative of the frequency domain energy distribution ratio in order to obtain the frequency domain energy distribution derivative comprises:

$$\text{ratio\_energy}'_k(f) = \left( \sum_{n=f-\frac{N-1}{2}}^{f+\frac{N-1}{2}} \left( \left( \prod_{\substack{i=f-\frac{N-1}{2} \\ i \ne n}}^{f+\frac{N-1}{2}} \frac{f-i}{n-i} \right) * \text{ratio\_energy}_k(n) \right) \right)',$$

$$f \in \left[ \frac{N-1}{2}, \left( F_{lim} - \frac{N-1}{2} \right) \right]$$

N representing a numerical differentiation order, ratio_energy'$_k$(f) representing a frequency domain energy distribution derivative of the $k^{th}$ frame, ratio_energy$_k$(n) representing the frequency domain energy distribution ratio of the $k^{th}$ frame, and $$f \in \left[ \frac{N-1}{2}, \left( F_{lim} - \frac{N-1}{2} \right) \right].$$

6. The method of claim 4, wherein obtaining the maximum value distribution characteristic of the frequency domain energy distribution derivative of the audio signal frame according to the frequency domain energy distribution derivative comprises:

acquiring at least one maximum value in derivative values of energy distribution parameters; and obtaining the maximum value distribution characteristic of the frequency domain energy distribution derivative of the audio signal frame according to a location of each maximum value at a spectral line.

7. The method of claim 1, wherein the detecting the to-be-detected frame according to a maximum value distribution characteristic of a frequency domain energy distribution derivative of the frame set comprises determining that the to-be-detected frame is a standard to-be-detected signal when a quantity of parameters that are in a preset first interval and in maximum value distribution parameters of the frequency domain energy distribution derivative of the frame set is greater than or equal to a first threshold.

8. An apparatus for detecting an audio signal according to frequency domain energy, comprising:

a receiver configured to receive an audio signal frame;

a memory storing executable instructions; and a processor coupled to the memory and the receiver and configured to:

acquire frequency domain energy distribution of the audio signal frame, the frequency domain energy distribution representing an energy distribution characteristic of the audio signal frame in a frequency domain;

obtain a maximum value distribution characteristic of a frequency domain energy distribution derivative of the audio signal frame according to the frequency domain energy distribution of the audio signal frame;

use the audio signal frame and each frame in a preset neighborhood range of the audio signal frame as a frame set, the frame set comprising a to-be-detected frame;

detect the to-be-detected frame according to a maximum value distribution characteristic of a frequency domain energy distribution derivative of the frame set;

determine whether the audio signal is a ringtone by analyzing the maximum value distribution characteristic of the frequency domain energy distribution derivative; and identify a country of origin of the audio signal based on the frequency domain energy distribution of the audio signal frame when the audio signal is a ringtone.

9. The apparatus of claim 8, wherein the processor is further configured to acquire a ratio of a sum of energy of the audio signal frame in any range in a specified frequency domain range to total energy of the audio signal frame in the specified frequency domain range, and the ratio represents the frequency domain energy distribution of the audio signal frame.

10. The apparatus of claim 9, wherein the processor is further configured to perform Fourier transform on the audio signal frame to obtain a frequency domain signal; and obtain the frequency domain energy distribution ratio according to $$\text{ratio\_energy}_k(f) = \frac{\sum_{i=0}^{f}(\text{Re\_fft}^2(i) + \text{Im\_fft}^2(i))}{\sum_{i=0}^{(F_{lim}-1)}(\text{Re\_fft}^2(i) + \text{Im\_fft}^2(i))} \times 100\%,$$

$$f \in [0, (F_{lim}-1)]$$

ratio_energy$_k$(f) representing the frequency domain energy distribution ratio, f representing a quantity of spectral lines, f∈[0, (F$_{lim}$−1)], it is assumed that a fast Fourier transform (FFT) transform size is F, F$_{lim}$≤F/2, Re_fft(i) representing a real part of an FFT transform result, Im_fft(i) representing an imaginary part of the FFT transform result, $$\sum_{i=0}^{(F_{lim}-1)}(\text{Re\_fft}^2(i) + \text{Im\_fft}^2(i))$$

representing a sum of energy of the audio signal frame in a frequency domain range corresponding to $$f \in [0, (F_{lim}-1)], \text{ and } \sum_{i=0}^{f}(\text{Re\_fft}^2(i) + \text{Im\_fft}^2(i))$$

representing total energy of the audio signal frame in a frequency domain range corresponding to 0~f.

11. The apparatus of claim 9, wherein the processor is further configured to:
    calculate a derivative of the frequency domain energy distribution ratio in order to obtain a frequency domain energy distribution derivative; and
    obtain the maximum value distribution characteristic of the frequency domain energy distribution derivative of the audio signal frame according to the frequency domain energy distribution derivative.

12. The apparatus of claim 11, wherein calculating the derivative of the frequency domain energy distribution ratio in order to obtain the frequency domain energy distribution derivative comprises:

$$\text{ratio\_energy}'_k(f) = \left(\sum_{n=f-\frac{N-1}{2}}^{f+\frac{N-1}{2}} \left(\left(\prod_{\substack{i=f-\frac{N-1}{2} \\ i \neq n}}^{f+\frac{N-1}{2}} \frac{f-i}{n-i}\right) * \text{ratio\_energy}_k(n)\right)\right)',$$

$$f \in \left[\frac{N-1}{2}, \left(F_{lim} - \frac{N-1}{2}\right)\right]$$

N representing a numerical differentiation order, ratio_energy'$_k$(f) representing a frequency domain energy distribution derivative of the k$^{th}$ frame, ratio_energy$_k$(n) representing the frequency domain energy distribution ratio of the k$^{th}$ frame, and $$f \in \left[\frac{N-1}{2}, \left(F_{lim} - \frac{N-1}{2}\right)\right].$$

13. The apparatus of claim 11, wherein the processor is further configured to:
    acquire at least one maximum value in derivative values of energy distribution parameters; and
    obtain the maximum value distribution characteristic of the frequency domain energy distribution derivative of the audio signal frame according to a location of each maximum value at a spectral line.

14. The apparatus of claim 8, wherein the processor is configured to determine that the to-be-detected frame is a standard to-be-detected signal when a quantity of parameters that are in a preset first interval and in maximum value distribution parameters of the frequency domain energy distribution derivative of the frame set is greater than or equal to a first threshold.

15. The apparatus of claim 8, wherein the processor is configured to determine that the to-be-detected frame is an abnormal to-be-detected signal when the to-be-detected frame is not a standard to-be-detected signal but a quantity of parameters that are in a preset second interval and in maximum value distribution parameters of the frequency domain energy distribution derivative of the frame set is greater than or equal to a second threshold.

16. The method of claim 1, wherein the detecting the to-be-detected frame according to a maximum value distribution characteristic of a frequency domain energy distribution derivative of the frame set comprises determining that the to-be-detected frame is an abnormal to-be-detected signal when the to-be-detected frame is not a standard to-be-detected signal but a quantity of parameters that are in a preset second interval and in maximum value distribution parameters of the frequency domain energy distribution derivative of the frame set is greater than or equal to a second threshold.

* * * * *